US010667475B2

(12) United States Patent
Ivory et al.

(10) Patent No.: US 10,667,475 B2
(45) Date of Patent: Jun. 2, 2020

(54) IRRIGATION FILTER SYSTEM

(71) Applicant: E-Z Flush Filters, LLC, Moses Lake, WA (US)

(72) Inventors: Garf Ivory, Moses Lake, WA (US); Michael O'Neill, Moses Lake, WA (US)

(73) Assignee: E-Z Flush Filters, LLC, Moses Lake, WA (US)

( * ) Notice: Subject to any disclaimer, the term of this patent is extended or adjusted under 35 U.S.C. 154(b) by 857 days.

(21) Appl. No.: 14/934,401

(22) Filed: Nov. 6, 2015

(65) Prior Publication Data

US 2016/0128286 A1    May 12, 2016

Related U.S. Application Data

(60) Provisional application No. 62/075,983, filed on Nov. 6, 2014.

(51) Int. Cl.
| | | |
|---|---|---|
| *B01D 35/30* | (2006.01) | |
| *C02F 1/00* | (2006.01) | |
| *B01D 29/66* | (2006.01) | |
| *B01D 29/35* | (2006.01) | |
| *B05B 15/40* | (2018.01) | |
| *A01G 25/02* | (2006.01) | |
| *B01D 35/02* | (2006.01) | |
| *B01D 29/33* | (2006.01) | |
| *C02F 103/02* | (2006.01) | |

(52) U.S. Cl.
CPC .......... *A01G 25/023* (2013.01); *B01D 29/35* (2013.01); *B01D 29/66* (2013.01); *B01D 35/02* (2013.01); *B01D 35/30* (2013.01); *C02F 1/001* (2013.01); *B01D 29/33* (2013.01); *B05B 15/40* (2018.02); *C02F 2103/02* (2013.01); *C02F 2301/026* (2013.01); *C02F 2303/24* (2013.01); *C02F 2307/14* (2013.01)

(58) Field of Classification Search
CPC ...... A01G 25/023; B01D 29/66; B01D 29/35; B01D 35/30; B01D 29/33; B01D 35/02; C02F 1/001; C02F 2301/026; C02F 2303/24; C02F 2307/14; C02F 2103/02; B05B 15/40

See application file for complete search history.

(56) References Cited

U.S. PATENT DOCUMENTS

| | | | |
|---|---|---|---|
| 4,072,271 A | 2/1978 | Voss | |
| 4,207,181 A * | 6/1980 | Drori | ................... B01D 35/22 210/111 |
| 4,790,481 A | 12/1988 | Ray | |
| 5,033,678 A | 7/1991 | Borghese | |
| 5,087,355 A | 2/1992 | Godec | |

(Continued)

*Primary Examiner* — Lucas A Stelling
*Assistant Examiner* — Angel Olivera
(74) *Attorney, Agent, or Firm* — Snell & Wilmer L.L.P.

(57) ABSTRACT

An irrigation filter system and method is provided. The system may have a body and a filtration subsystem and may separate fluid from detritus carried by the fluid. The fluid may be released onto a crop, while the detritus is collected by the filtration subsystem. A drain fixture may be operated to release the detritus from the irrigation filter system in response to at least one of the pressure of the fluid flowing in the system and gravity. In this manner, the detritus may be released without requiring the system to be shut down and/or disassembled.

18 Claims, 18 Drawing Sheets

(56) References Cited

U.S. PATENT DOCUMENTS

| | | | |
|---|---|---|---|
| 5,406,974 A * | 4/1995 | Griswold | B01D 35/157 |
| | | | 137/454.6 |
| 5,431,814 A | 7/1995 | Jorgensen | |
| 5,785,248 A | 7/1998 | Staylor | |
| 5,863,443 A * | 1/1999 | Mainwaring | B01D 21/0012 |
| | | | 210/800 |
| 6,575,307 B2 | 6/2003 | Lockwood | |
| 7,900,854 B2 | 3/2011 | Beer | |
| 8,622,317 B1 | 1/2014 | Anuskiewicz | |
| 2002/0063166 A1 | 5/2002 | Walker | |
| 2003/0183587 A1 * | 10/2003 | Hawkins | B01D 29/118 |
| | | | 210/787 |
| 2004/0112806 A1 | 6/2004 | Anderson | |
| 2006/0091236 A1 | 5/2006 | Helzer | |
| 2007/0241214 A1 * | 10/2007 | Beer | A01G 25/023 |
| | | | 239/590 |
| 2009/0120866 A1 | 5/2009 | Ros Roca | |
| 2009/0266917 A1 | 10/2009 | Klein | |
| 2010/0288686 A1 | 11/2010 | Neibert | |
| 2011/0233132 A1 | 9/2011 | Wietharn | |
| 2012/0125867 A1 | 5/2012 | Andersen | |

* cited by examiner

IRRIGATION FILTER SYSTEM

CROSS-REFERENCE TO RELATED APPLICATION

This application claims priority to U.S. Provisional Patent Application No. 62/075,983 filed Nov. 6, 2014, and entitled "Irrigation Filter System," which is incorporated herein by reference in its entirety to the extent it is not inconsistent with this disclosure.

FIELD

The present invention relates to an irrigation filter system, and more particularly, to an irrigation filter system that filters water at each individual spray nozzle and permits filters to be cleaned without shutting off fluid flow to a spray nozzle.

BACKGROUND

Irrigation systems, such as wheel move or pivot crop sprinkler systems often include multiple water spray nozzles to apply water to a crop. Dirt, mineral deposits, such as lime or calcium, scale, rust, and other detritus (collectively "deposits") frequently collect within a sprinkler system, causing spray nozzles to clog. Prior filter systems attempted to prevent the spray nozzles from clogging, but allowed deposits to lodge within the filter, requiring the flow of water to be shut down for periodic removal and cleaning of the filter. Other prior filter systems permitted cleaning during operation, but often were ineffective at releasing the collected deposits that remained lodged near the filter, causing ineffective cleaning, and/or eventual leakage.

SUMMARY

An irrigation filter system is disclosed. The system may include a body and a filtration subsystem. The filtration subsystem may include an unfiltered chamber including a drain fixture and configured to receive along a first path a first fluid containing a first quantity of a detritus. The filtration system may include a filter disposed within the unfiltered chamber wherein the detritus is retained, and a filtered chamber including a nozzle fixture. In various embodiments, at least one of the nozzle fixture and the drain fixture releases the first fluid from the irrigation filter system along a second path and a third path respectively.

DETAILED DESCRIPTION

Figure 1:
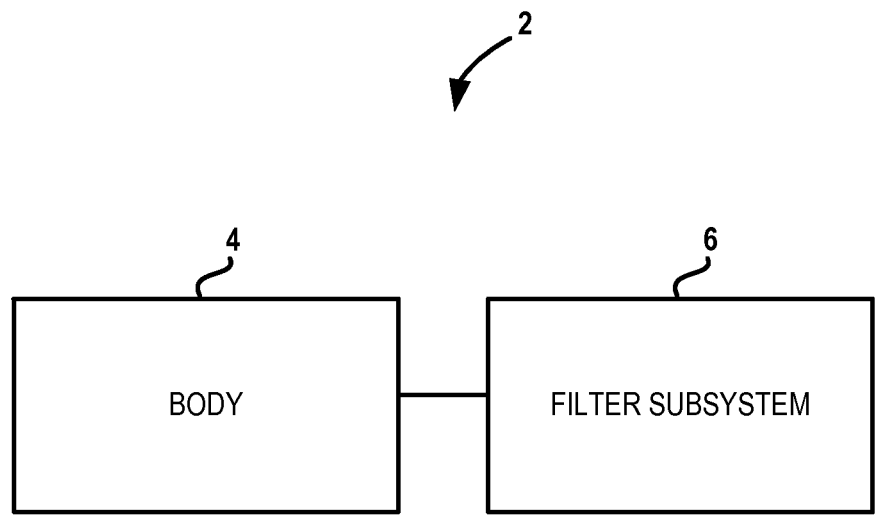
FIG. 1 illustrates a block diagram illustrating an irrigation filter system comprising a body and a filter subsystem according to various embodiments.

The detailed description herein makes use of various exemplary embodiments to assist in disclosing the present invention. While these exemplary embodiments are described in sufficient detail to enable those skilled in the art to practice the invention, it should be understood that other embodiments may be realized and that modifications of structures, arrangements, applications, proportions, elements, materials, or components used in the practice of the instant invention, in addition to those not specifically recited, can be varied or otherwise particularly adapted to specific environments, manufacturing specifications, design parameters or other operating requirements without departing from the scope of the present invention and are intended to be included in this disclosure. Thus, the detailed description herein is presented for purposes of illustration only and not of limitation.

For the sake of brevity, conventional techniques for manufacturing and construction may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical method of construction.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably. As used herein, to be connected in "fluid communication" or "fluidic communication" or to be in "fluidic interconnection" means that a passage exists between the connected elements via which a fluid, including a gas and/or a liquid and/or any other non-solid matter, may pass from one connected element to another connected element. As used herein, "parallel" means substantially parallel, specifically, with no more than a +/−15 degree deviation from parallel. For instance, a first path, line or axis lying in a first plane is parallel to a second path, line, or axis lying in a second plane if the planes are coincident, or otherwise are within +/−15 degrees of being coincident.

As used herein, detritus includes but is not limited to dirt, varmint carcasses, sticks, plant matter, other biological matter, mineral deposits such as lime or calcium or other mineral deposits, scale, rust, debris, and other undesirable matter.

Wheelmove irrigation systems and center-pivot irrigation systems have multiple spray nozzles to apply water to a crop. Each spray nozzle releases a quantity of water as the irrigation system moves across a field. Detritus may enter the irrigation system, causing clogging and poor water flow. Thus, there is a need for a filter at each spray nozzle. Moreover, because of the size of the irrigation systems, cleaning the filters is often a lengthy task. Moreover, disassembly and reassembly of irrigation system components often accelerates wear of the system and introduces leaks.

Furthermore, collected detritus may lodge relatively firmly within the filters, for example, due to the relative pressure of the water. Thus, there is a need for a filtering system that optionally allows cleaning while the water is pressurized, such as while the irrigation system is applying water to the crop, and that optionally also allows cleaning of the detritus from the filter without removing the filter. There is a need for a filtering system that utilizes the pressure of the water flowing through the system to liberate any detritus from the filter and flush it from the system, during the cleaning process.

Thus, with reference to FIG. 1, an irrigation system may comprise body 4 and a filtration subsystem 6. The body 4 may provide the physical structure to support and retain the filtration subsystem 6. The filtration subsystem 6 may direct the flow of water from an inlet to a spray nozzle, and facilitate draining of a filter, as desired.

The body 4 may comprise various different embodiments whereby the filtration subsystem 6 may be supported. For example, with reference to FIGS. 1, 2A-B, 5A-C, and 6, a body 4 may comprise an upper shell 8, a lower shell 10, and braces 12. With reference to FIGS. 1, 2A-B, 7, and 8, a body 4 may comprise a primary reservoir 14 and a secondary reservoir 16. With reference to FIGS. 1, 2A-B, 3, 4A-C, and 9, a body 4 may comprise a unitary block 18. A body 4 may comprise variations on and combinations of various features of various different embodiments.

Figure 2A:
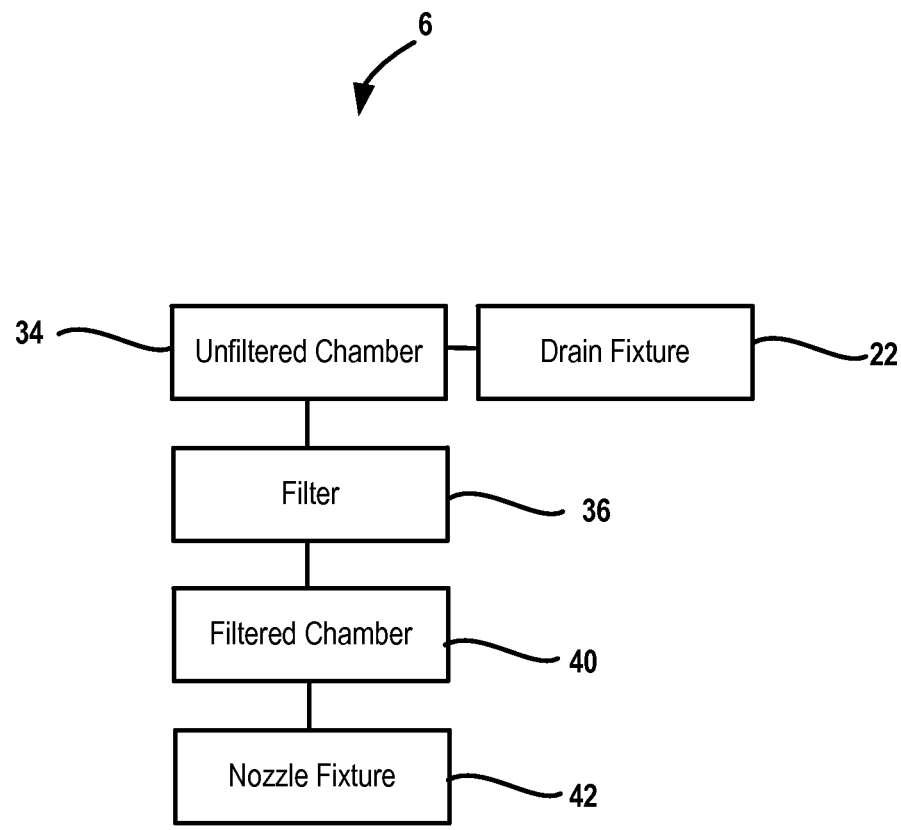
FIGS. 2A-B illustrate various aspects of filter subsystems according to various embodiments.

With reference to FIG. 2A, a filtration subsystem 6 may comprise an unfiltered chamber 34 in fluidic communication with a drain fixture 22 and a filter 36. The filter subsystem may comprise a filtered chamber 40 in fluidic communication with the filter 36, and may comprise a nozzle fixture 42 in fluidic communication with the filtered chamber 40. Water may enter the unfiltered chamber 34 and pass through the filter 36 into the filtered chamber 40, whereupon it is released via the nozzle fixture 42 to a spray nozzle. To clean detritus from the filtration subsystem 6, a user may operate the drain fixture 22, permitting the unfiltered chamber 34 to be in fluidic communication with the ambient environment, and allowing the fluid therein, and/or gravity, to force the detritus through the drain fixture 22 and out of the filtration subsystem 6.

Figure 2B:
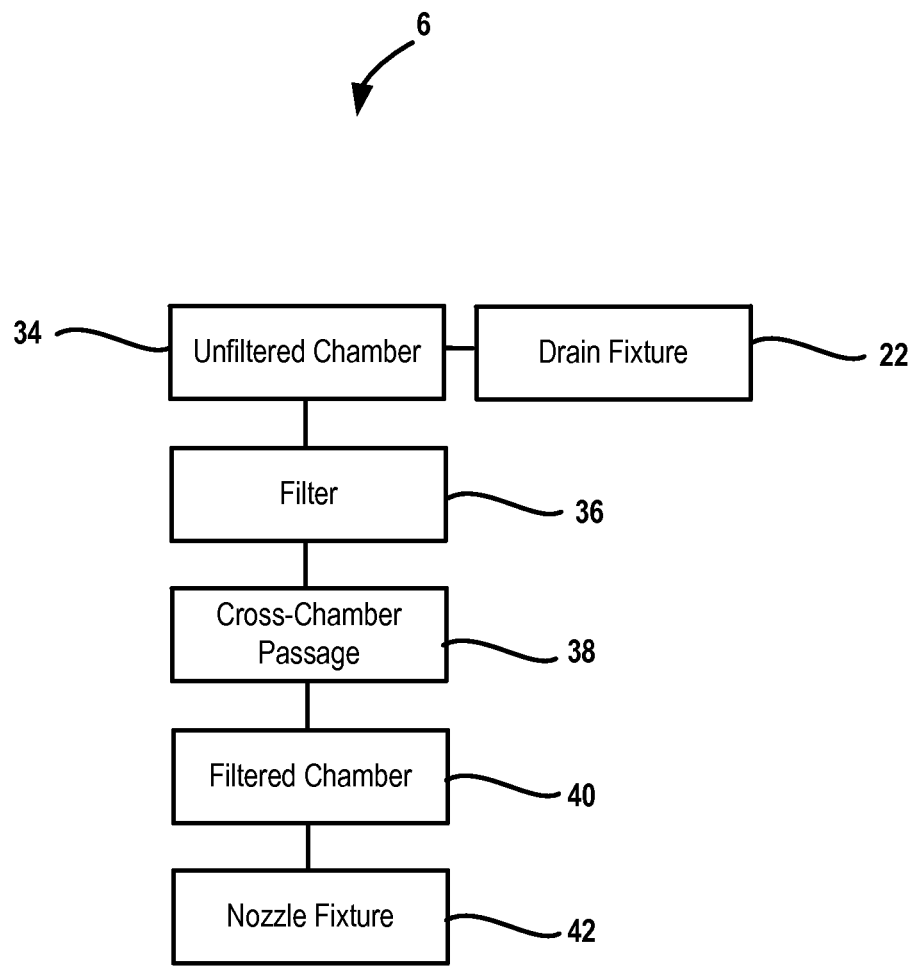
Figure 3:
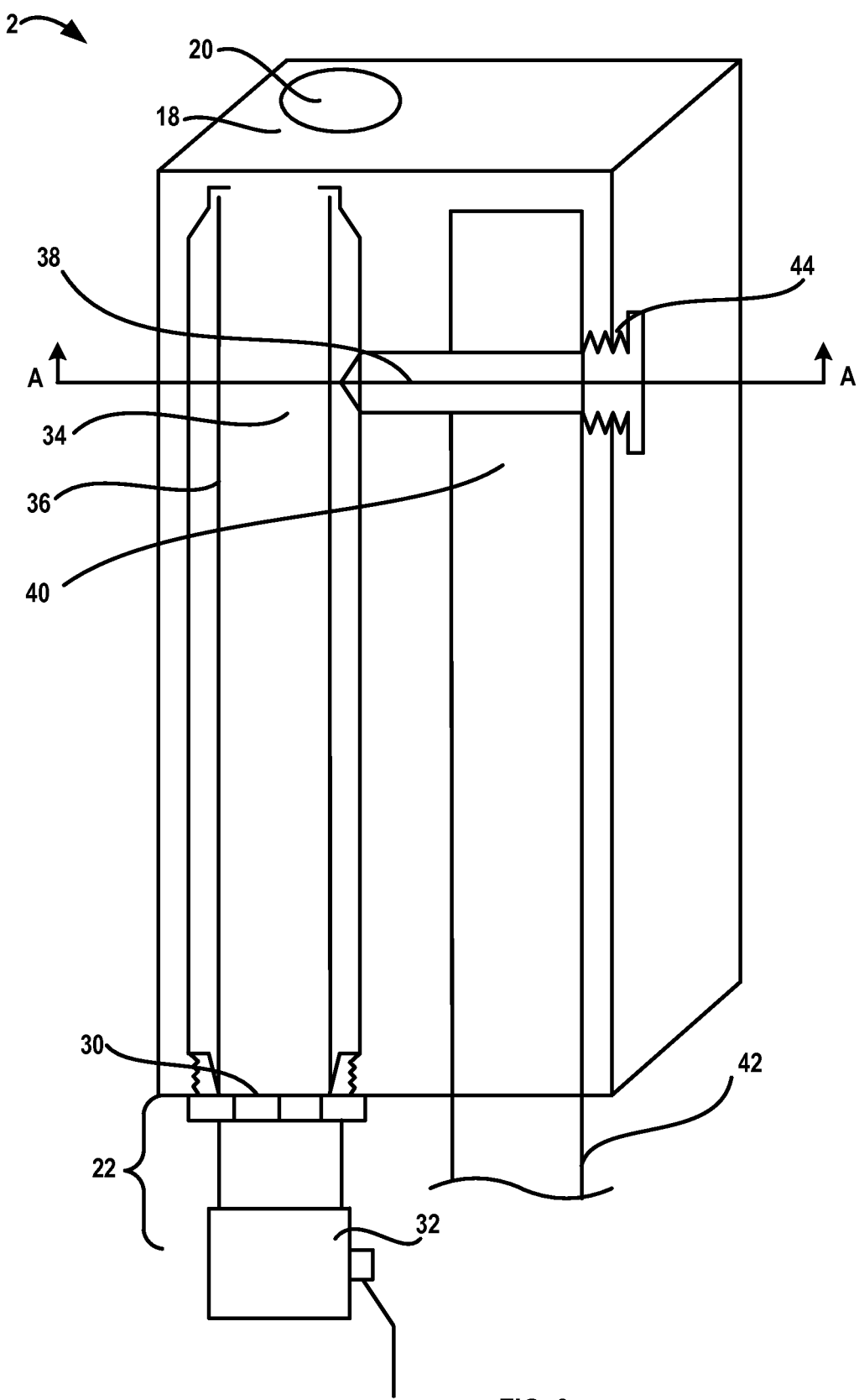
FIG. 3 illustrates various aspects of an irrigation filter system comprising a body comprising a unitary block, and a filter subsystem according to various embodiments.
Figure 4A:
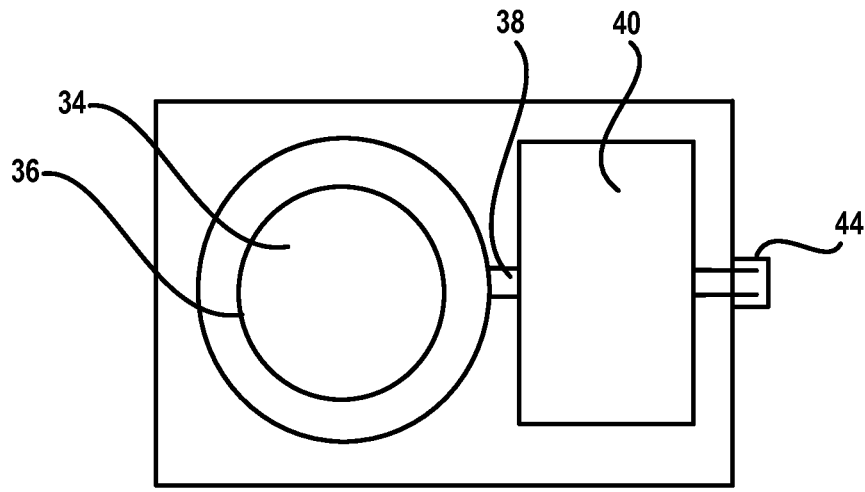
FIG. 4A illustrates a section view of an irrigation filter system according to FIG. 3.
Figure 4B:
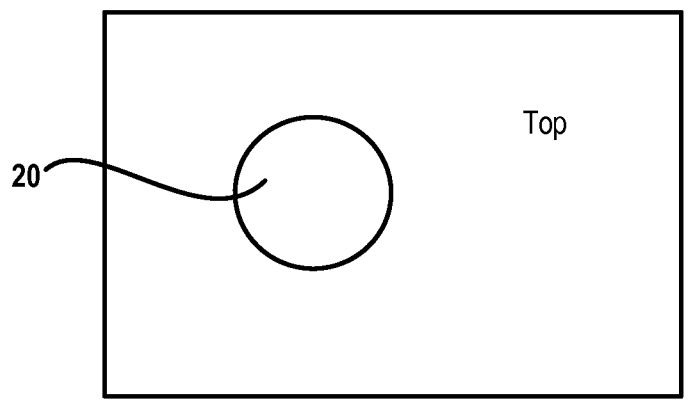
FIG. 4B illustrates a top view of an irrigation filter system according to FIG. 3.
Figure 4C:
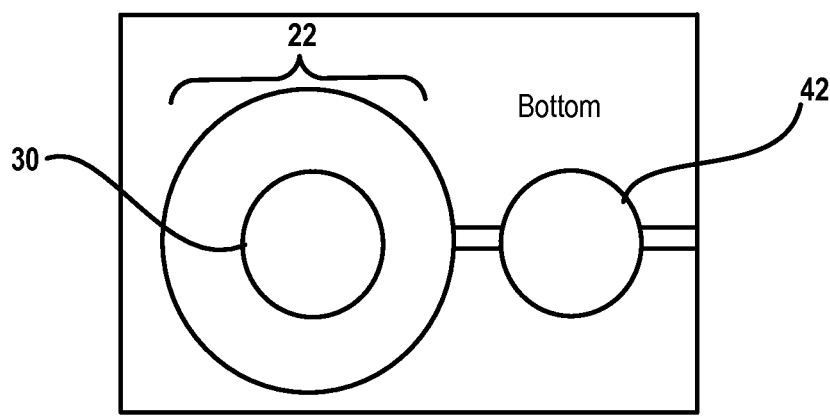
FIG. 4C illustrates a bottom view of an irrigation filter system according to FIG. 3.

With reference to FIG. 2B, a filtration subsystem 6 may further comprise cross-chamber passage 38 disposed between the filter 36 and the filtered chamber 40. The cross-chamber passage 38 may comprise any void whereby the direction and/or velocity of the fluid passing from the filter 36 to the filtered chamber 40 may be altered. In this manner, the overall shape, size, and balance of the filtration subsystem 6 may be tailored to fit within desired criteria.

For example, water enters and exits the filtration subsystem 6 on parallel axes. The cross-chamber passage 38 facilitates the orientation of the filter 36 longitudinally parallel to the axes on which the water enters and exits by permitting the axes on which the water enters and the axis on which the water exits to be parallel, rather than non-parallel, and permitting the filter 36 to be longitudinally parallel as well. In this manner, the filtration subsystem 6 may comprise a compact apparatus wherein the filter 36 has a first longitudinal axis and the water enters on a first path comprising an axis parallel to the first longitudinal axis and the water exits on a second path comprising an axis parallel to the first longitudinal axis. Moreover, the second path and first longitudinal axis may be coincident.

Figure 5A:
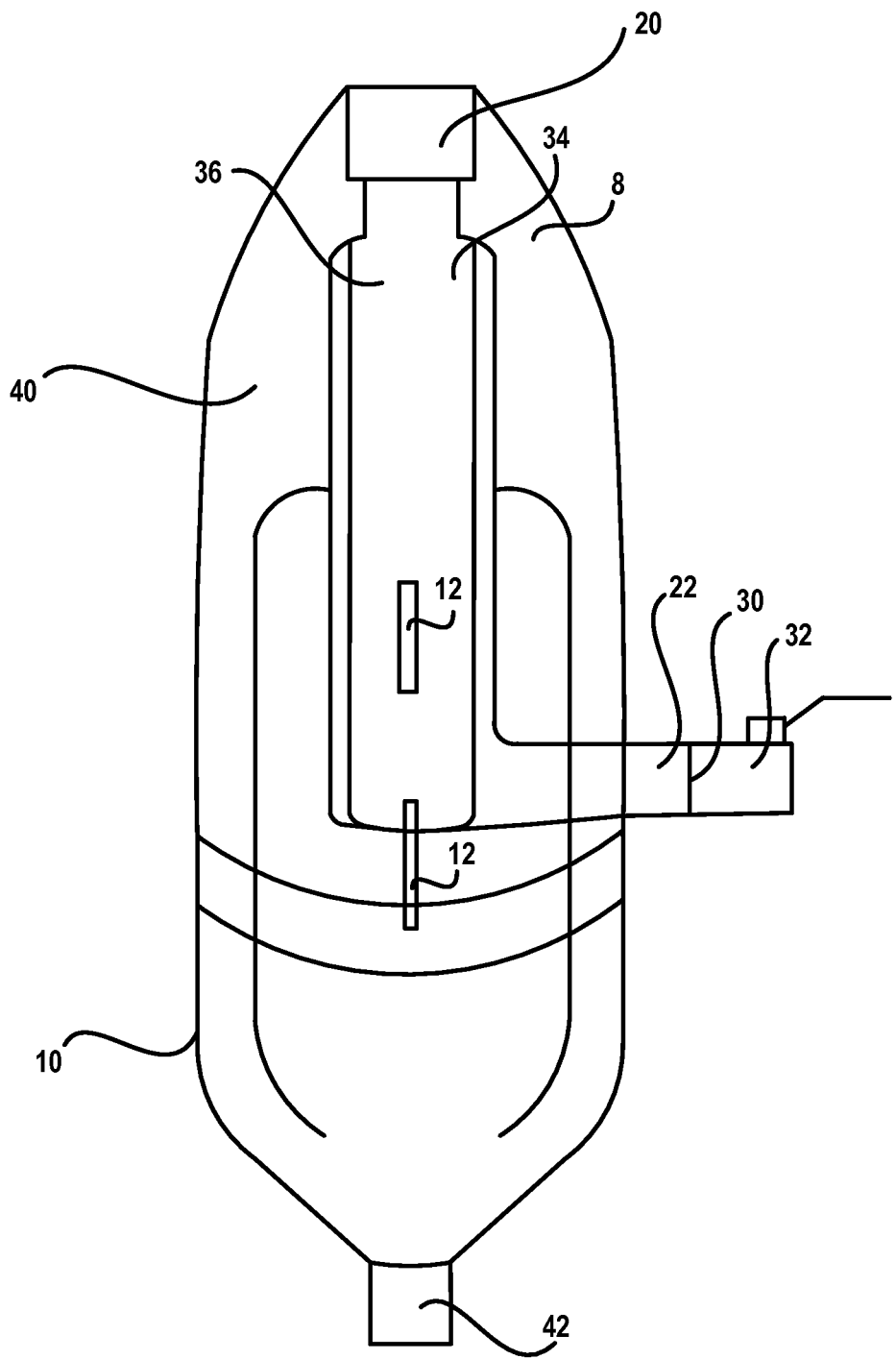
FIGS. 5A-C illustrate various aspects of irrigation filter systems each comprising a body comprising an upper shell and a lower shell, and a filter subsystem according to various embodiments.
Figure 5B:
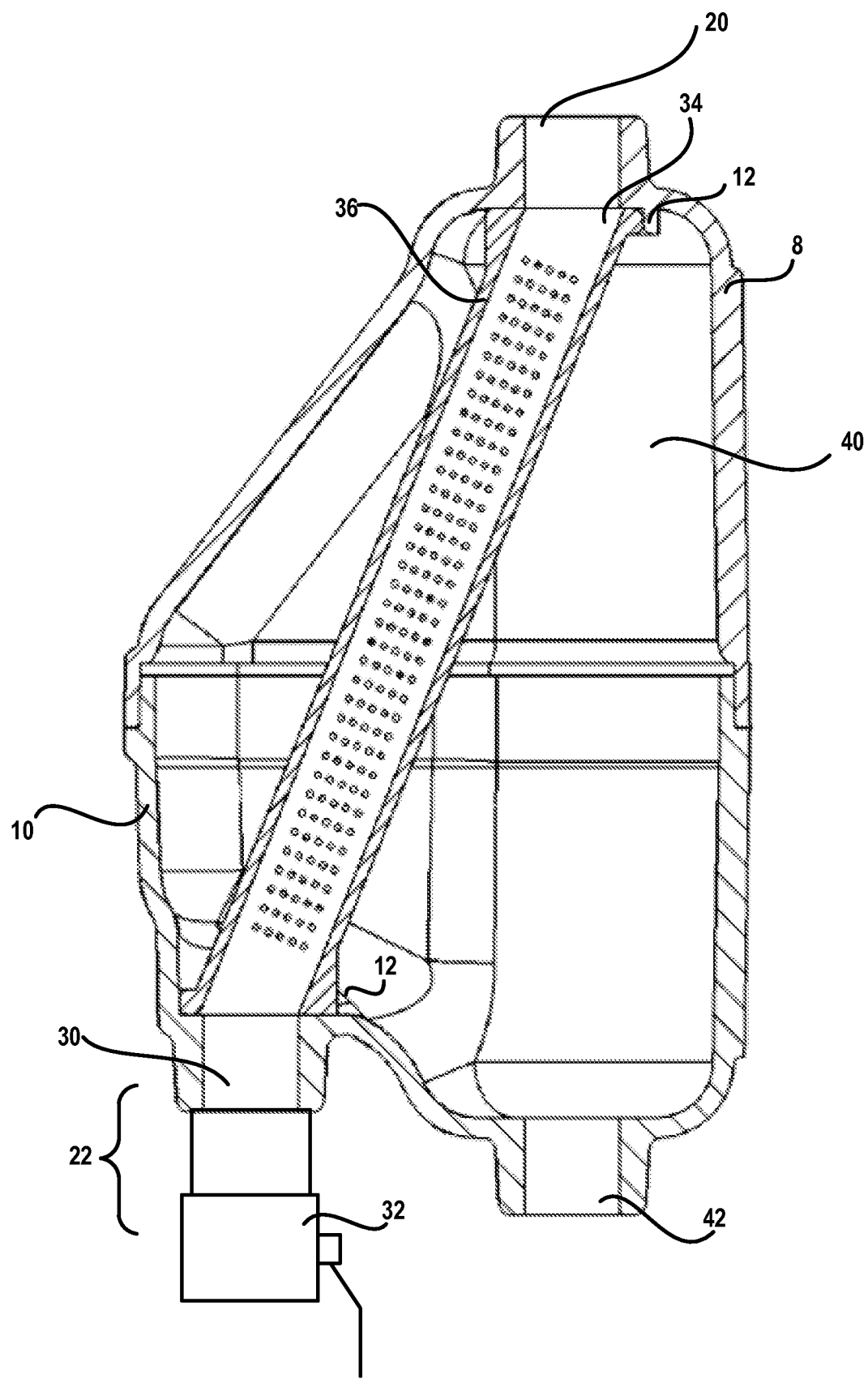
Figure 5C:
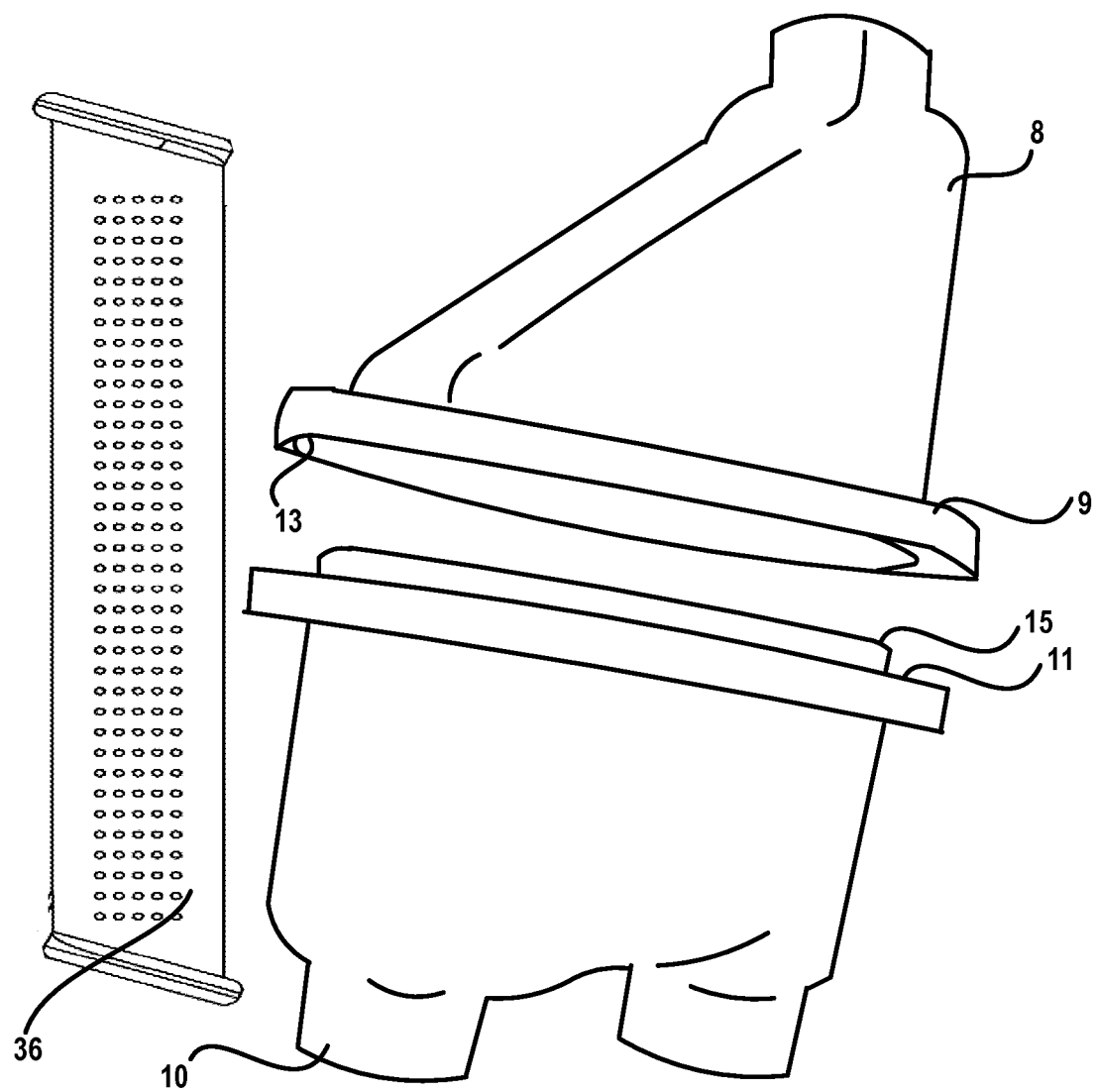
Figure 6:
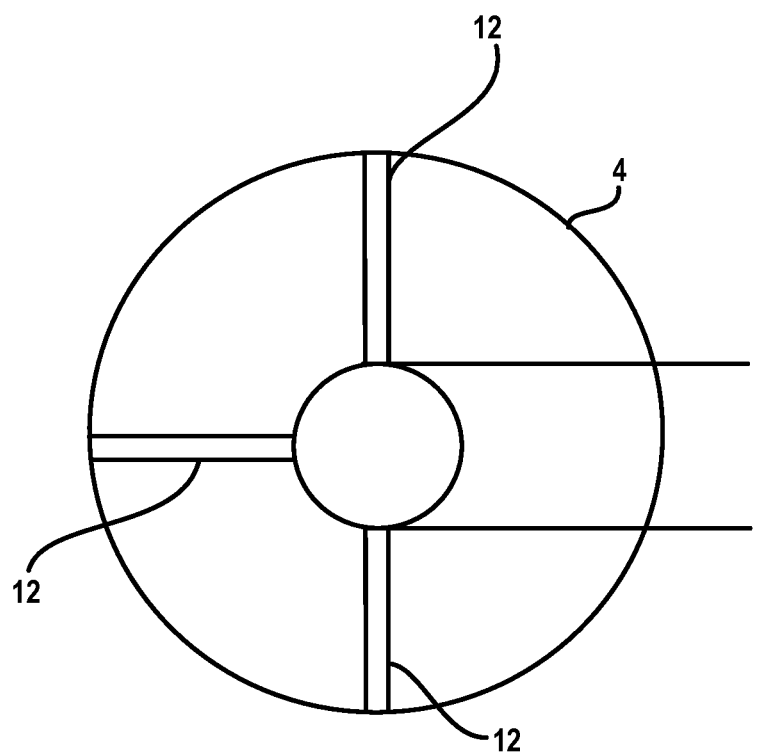
FIG. 6 illustrates a section view of an irrigation filter system according to FIG. 5A.
Figure 7:
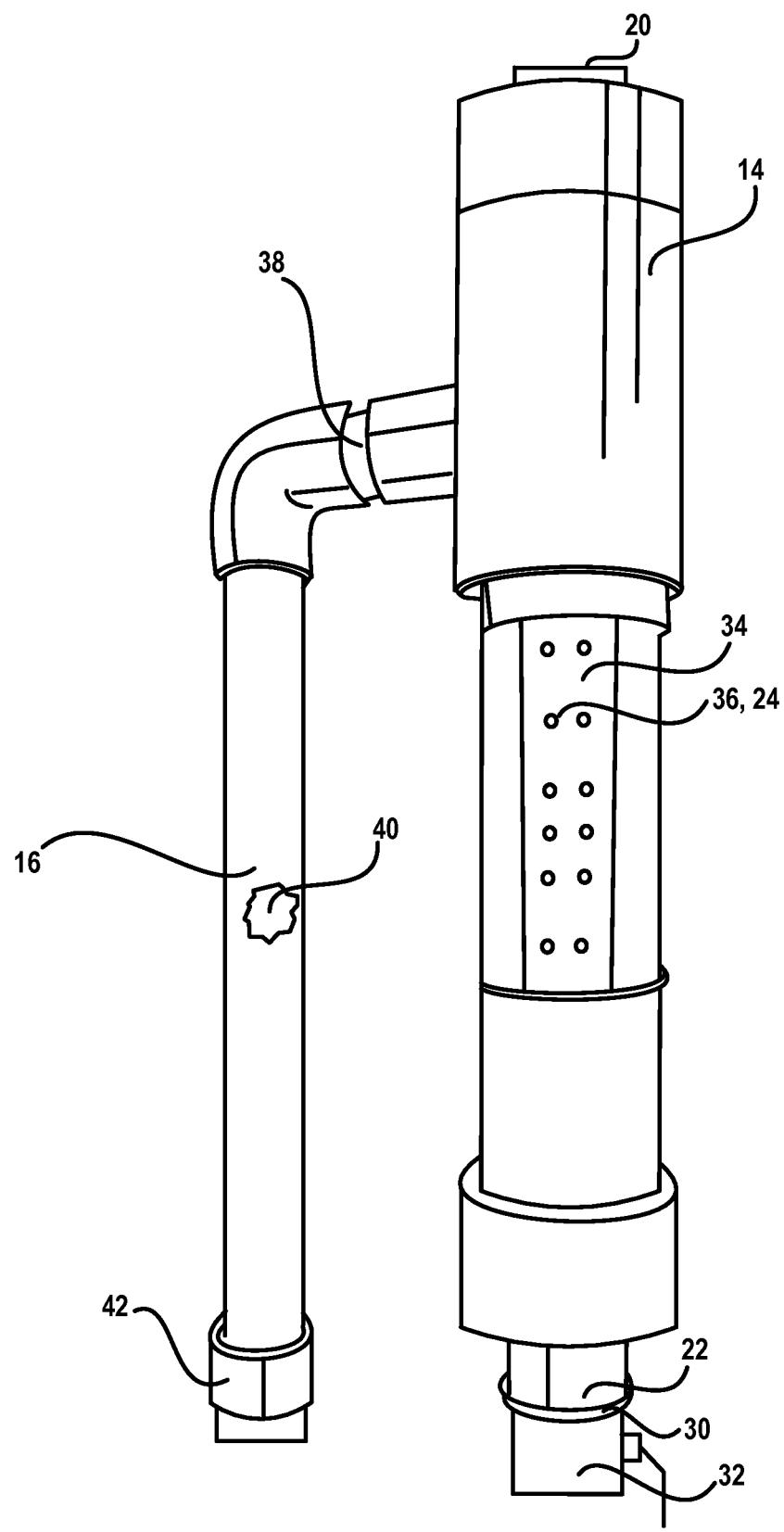
FIGS. 7-8 illustrate various aspects of irrigation filter systems comprising a body comprising a primary reservoir and a secondary reservoir, and a filter subsystem according to various embodiments.

For further example, with specific reference to FIG. 2B and 5B-C, water may enter and exit a filtration subsystem 6 on parallel axes, wherein the orientation of the filter 36 diagonally relative to the axes on which the water enters and exits permits the axis on which the water enters and the axis on which the water exits to be parallel, and yet permits the omission of the cross-chamber passage 38. In this manner, the filtration subsystem 6 may comprise a compact apparatus wherein the water enters on a first path comprising an axis comprising a longitudinal axis and the water exits on a second path comprising an axis parallel to the longitudinal axis, but wherein the filter 36 has a second longitudinal axis non-parallel with the first longitudinal axis. Moreover, water may enter and exit a filtration subsystem 6 on coincident collinear axes. In this manner, undue movement of the irrigation filter system 2 may be minimized. For instance, the force exerted by flowing water exiting through the nozzle fixture 42 and/or other systems, such as a sprinkler head, may be substantially along the same vector as the force exerted by the water entering the system through inlet 20. As such, the rotational and/or translational component of the net force may be minimized. Moreover, the force of the water exiting may be aligned along the same vector as gravity, so that undue movement, such as due to the rotational and/or translational component of the net force including gravitational force, may be minimized.

Unitary Body Irrigation Filter System

With reference to FIGS. 1, 2B, 3, and 4A-C, and 9, an irrigation filter system 2 may comprise a body 4 comprising unitary block 18, and may comprise a filtration subsystem 6. The filtration subsystem 6 may comprise an unfiltered chamber 34, a filter 36, a cross-chamber passage 38, a filtered chamber 40, and a nozzle fixture 42. Water may enter the unfiltered chamber 34 and detritus may collect therein. The water may flow through the filter 36, which retains the detritus, and the water may be conducted through a cross-chamber passage 38, into the filtered chamber 40. In this manner, the detritus may be retained within at least a portion of the unfiltered chamber 34 and water may be permitted to enter the filtered chamber 40. Subsequently, the water may be released through a nozzle fixture 42 to other systems, such as a sprinkler head, for application on a crop.

A unitary block 18 may comprise a single piece of material having various cavities and apertures formed therein. A unitary block 18 may comprise a milled billet, or may comprise an injection molded block, or may comprise an investment cast block, or may comprise multiple pieces of material joined by at least one of welding, sonic welding, brazing, casting, or any other manufacturing technique. Alternatively, a unitary block 18 may comprise a preformed pipe section such as a ABS pipe section. In this manner, a structure may be formed to support the filtration subsystem 6, and prevent leakage of water from filtration subsystem 6.

An unfiltered chamber 34 further comprises an inlet 20 and a drain fixture 22. An unfiltered chamber 34 may accept the inflow of water via the inlet 20. Inlet 20 may comprise an aperture. In further embodiments, inlet 20 comprises a fitting by which the unfiltered chamber 34 and/or filter 36 may be connected in fluidic communication to a fluid supply. Inlet 20 may comprise a threaded male or female fitting, or any other fitting, and in further embodiments, may support the weight of the irrigation filter system 2. The unfiltered water may carry a mixture of detritus as it enters the unfiltered chamber 34 and/or filter 36 through the inlet 20. As the water enters the unfiltered chamber 34 and/or filter 36, the detritus may collect in the unfiltered chamber 34, lodging in the chamber in response to at least one of the pressure of the flowing water entering the unfiltered chamber 34 and gravity. In various embodiments, the detritus may collect proximate to a drain fixture 22. In this manner, the drain fixture 22 may be opened and at least one of the pressure of the flowing water entering the unfiltered chamber 34 and gravity may force the detritus through the drain fixture 22 and out of the unfiltered chamber 34. In this manner, the unwanted matter may be removed from the system without need of removing the filter 36 or shutting off the flowing water.

Figure 9:
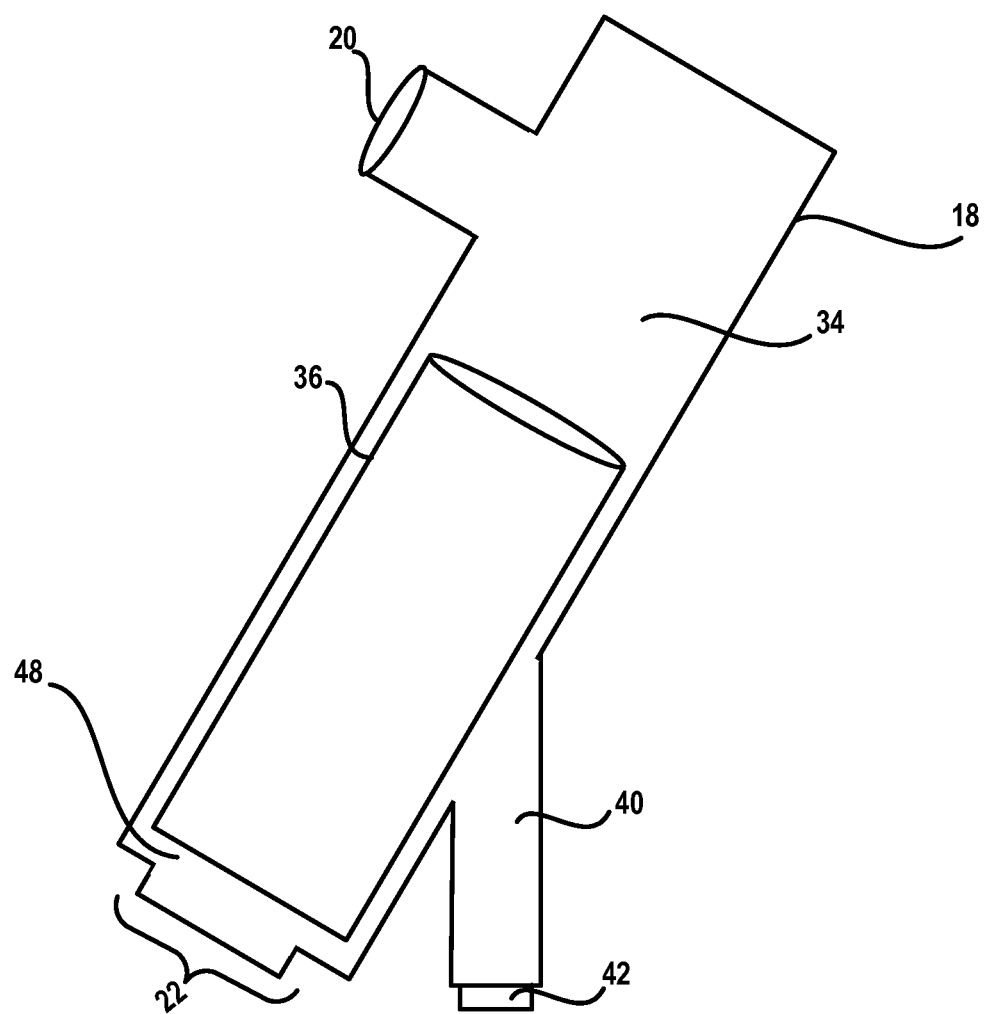
FIG. 9 illustrates various aspects of an irrigation filter system comprising a body comprising a unitary block and having a filter quick-removal plug according to various embodiments.

With specific reference to FIG. 9, an unfiltered chamber 34 may additionally comprise a filter quick removal plug 48. A filter quick removal plug 48 may comprise a removable closure disposed at one end of the unfiltered chamber 34 that may be opened to permit removal of the filter 36 and/or cleaning of detritus from within the filter 36. As one may appreciate, a filter quick removal plug 48 and a drain fixture (FIG. 3; 22) may alternately be incorporated in fluidic communication with the unfiltered chamber 34. In further embodiments, both a filter quick removal plug 48 and a drain fixture (FIG. 3; 22) may be incorporated in fluidic communication with the unfiltered chamber 34. For example, a filter quick removal plug 48 may be disposed at one end of a unfiltered chamber 34, and a drain fixture (FIG. 3; 22) may be disposed within the filter quick removal plug 48, such as in the center of the filter quick removal plug 48.

With renewed reference to FIGS. 1, 2B, 3, and 4A-C, and 9, a cross-chamber passage 38 may comprise a channel in fluidic communication with the filtered chamber 40. As the water passes through the filter 36 and is liberated of detritus, it may enter at least one of directly into the filtered chamber 40, or into a cross-chamber passage 38. A cross-chamber passage 38 may be any length, cross-sectional area, and shape desired to direct a desired volume of water in a desired direction and at a desired rate. For example, a cross-chamber passage 38 may comprise a cylindrical void oriented perpendicular to the orientation of the filtered chamber 40. In this manner, the filtered chamber 40 and the unfiltered chamber 34 may be disposed side-by-side, thus permitting the length of the irrigation filter system 2 to be minimized, or otherwise permitting the overall shape, size, and balance of the filtration subsystem 6 to be tailored to fit within desired criteria. For example, water enters and exits the filtration subsystem 6 on parallel axes. The cross-chamber passage 38 facilitates the orientation of the filter 36 longitudinally parallel to the axes on which the water enters and exits by permitting the axes on which the water enters and the axis on which the water exits to be parallel, rather than non-parallel, and permitting the filter 36 to be longitudinally parallel as well. In this manner, the filtration subsystem 6 may comprise a compact apparatus wherein the filter 36 has a first longitudinal axis and the water enters on a first path comprising an axis parallel to the first longitudinal axis and the water exits on a second path comprising an axis parallel to the first longitudinal axis. Moreover, the second path and first longitudinal axis may be coincident.

Moreover, the cross-chamber passage 38 may be any length, cross-sectional area, and shape selected with consideration for manufacturing concerns. For instance, the cross-chamber passage 38 may comprise a cylindrical void capable of being produced by drilling a hole through a portion of the unitary block 18, passing into the unfiltered chamber 34 and proximate to the filter 36. A cap 44 may be threaded into an external opening created by the drilling process, whereby leakage may be prevented.

Moreover, the cross-chamber passage 38 may be positioned generally away from the drain fixture 22. In this manner, the diversion of the water from entering the cross-chamber passage 38 to instead exiting via the drain fixture 22 during draining of the unfiltered chamber 34 may be enhanced. Furthermore, the cross-chamber passage 38 may be positioned coincident with a path perpendicular to the flow of water into the unfiltered chamber 34, thus discouraging water from entering the cross-chamber passage 38 unless the unfiltered chamber 34 is filled substantially full of water. In this manner, the passage of water into the cross-chamber passage 38 may be substantially prevented upon opening of the drain fixture 22, and may be substantially permitted upon closing of the drain fixture 22 and filling of the unfiltered chamber 34 with water. Water mixed with detritus may enter and exit the drain fixture 22 along a third axis, which in some embodiments may be parallel to the longitudinal axes of the filter 36, and/or the axes on which water enters the system and/or the axis on which water exits the system via the nozzle fixture 42.

A filtered chamber 40 may comprise a void in fluidic communication with at least one of the unfiltered chamber 34 and a cross-chamber passage 38. Water may enter the filtered chamber 40 subsequent to the liberation of detritus from the water by the filter 36 and may be conducted by the filtered chamber 40 to a nozzle fixture 42. A filtered chamber 40 may comprise any shape, volume, and orientation with consideration for directing the flow of water to a nozzle fixture 42 having a desired orientation.

A nozzle fixture 42 may be disposed in fluidic communication with the filtered chamber 40 and may receive water from the filtered chamber 40 and convey it to an external apparatus, such as a spray nozzle. In various embodiments, the nozzle fixture 42 comprises an approximately ¾" male or female threaded fitting, although the nozzle fixture 42 may comprise any fitting selected to permit the attachment of a desired sprinkler head.

A filter 36 may comprise any porous or semi porous material or series of apertures whereby detritus may be collected on one side of the filter 36, and water may be permitted to flow through the pores and/or apertures, apart from the detritus. A filter 36 may comprise any shape corresponding to the unfiltered chamber 34. For instance, in various embodiments, the unfiltered chamber 34 comprises a cylindrical void, and similarly the filter 36 comprises a cylindrical filter 36. However, in further embodiments, a filter 36 may comprise a shape different from the unfiltered chamber 34; for example, the filter 36 may comprise a planar screen, a conic section, a trapezoidal section, or any other configuration and may be disposed across a portion of the unfiltered chamber 34. For instance, an unfiltered chamber 34 may comprise a rectangular void and filter 36 may comprise a conic section disposed within the rectangular void. In this manner, the filter 36 and the unfiltered chamber 34 are selected with consideration for directing the flow of detritus to a drain fixture 22 in response to at least one of gravity and a pressure of the flowing water entering the unfiltered chamber 34.

Having discussed various aspects of a filtration subsystem 6, a drain fixture 22 is presented in further detail. A drain fixture 22 may comprise an orifice 30 and a ball valve 32. The orifice 30 may be in fluid communication with the unfiltered chamber 34. The ball valve 32 may be operated by a technician to open and close the orifice 30 to the ambient environment. By opening and closing the ball valve 32, detritus collected by the filter 36 may be allowed to flow through the ball valve 32 and escape the irrigation filter system 2. In this manner, the ball valve 32 may function as a bypass valve with respect to the nozzle fixture 42, and/or the filtered chamber 40, permitting the water to directly pass from the unfiltered chamber 34 and out of the irrigation filter system 2. The ball valve 32 may be manually operated, or may be automatically operated, such as by an actuator in response to a sensor detecting that a first quantity of detritus has collected within the unfiltered chamber 34. Furthermore, while the ball valve 32 may comprise a ball valve, it may also comprise any type of valve configured to selectively open and close the orifice 30 from the ambient environment.

Figure 10A:
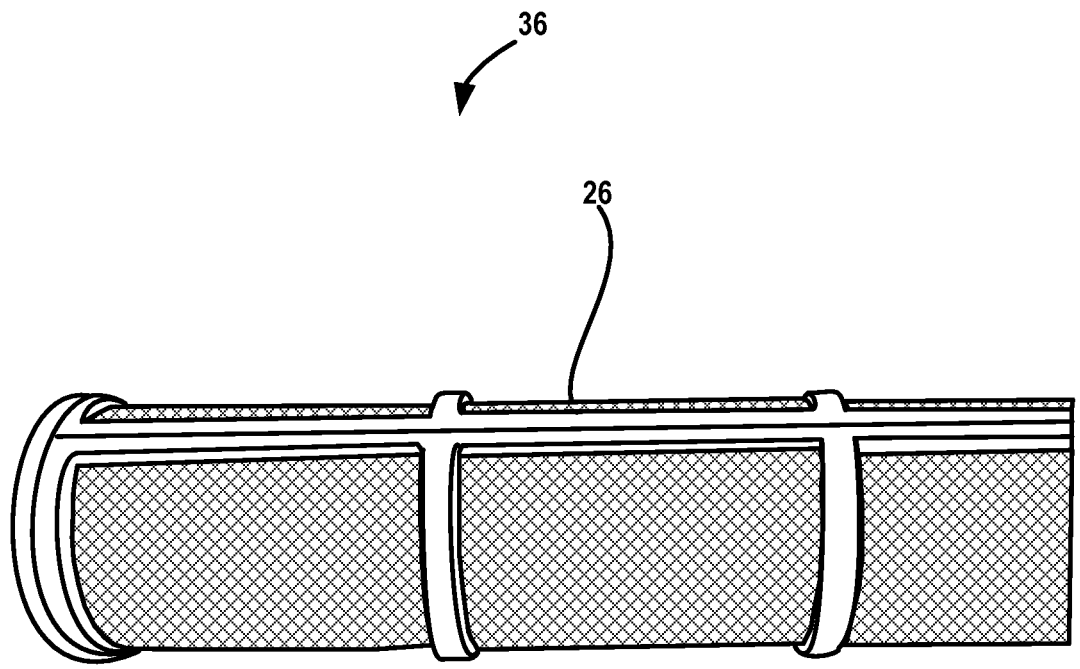
FIG. 10A illustrates a filter comprising a screen filter, according to various embodiments.
Figure 10B:
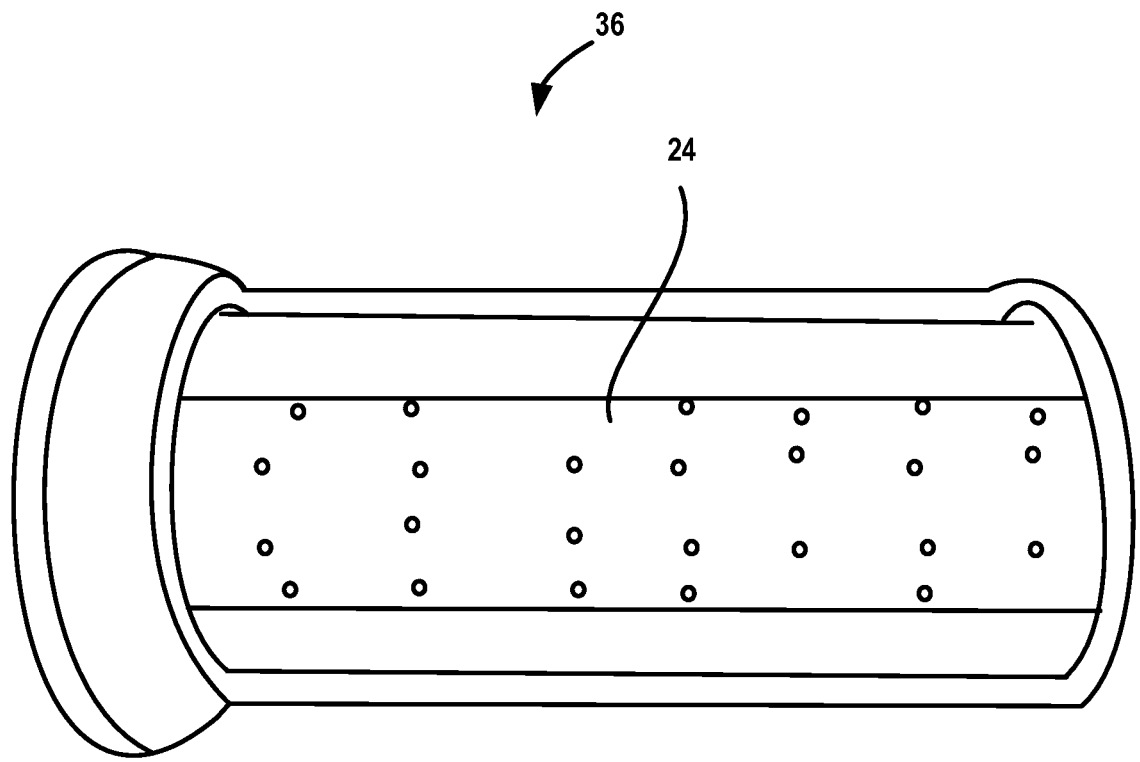
FIG. 10B illustrates a filter comprising an integral pipe filter, according to various embodiments.
Figure 10C:
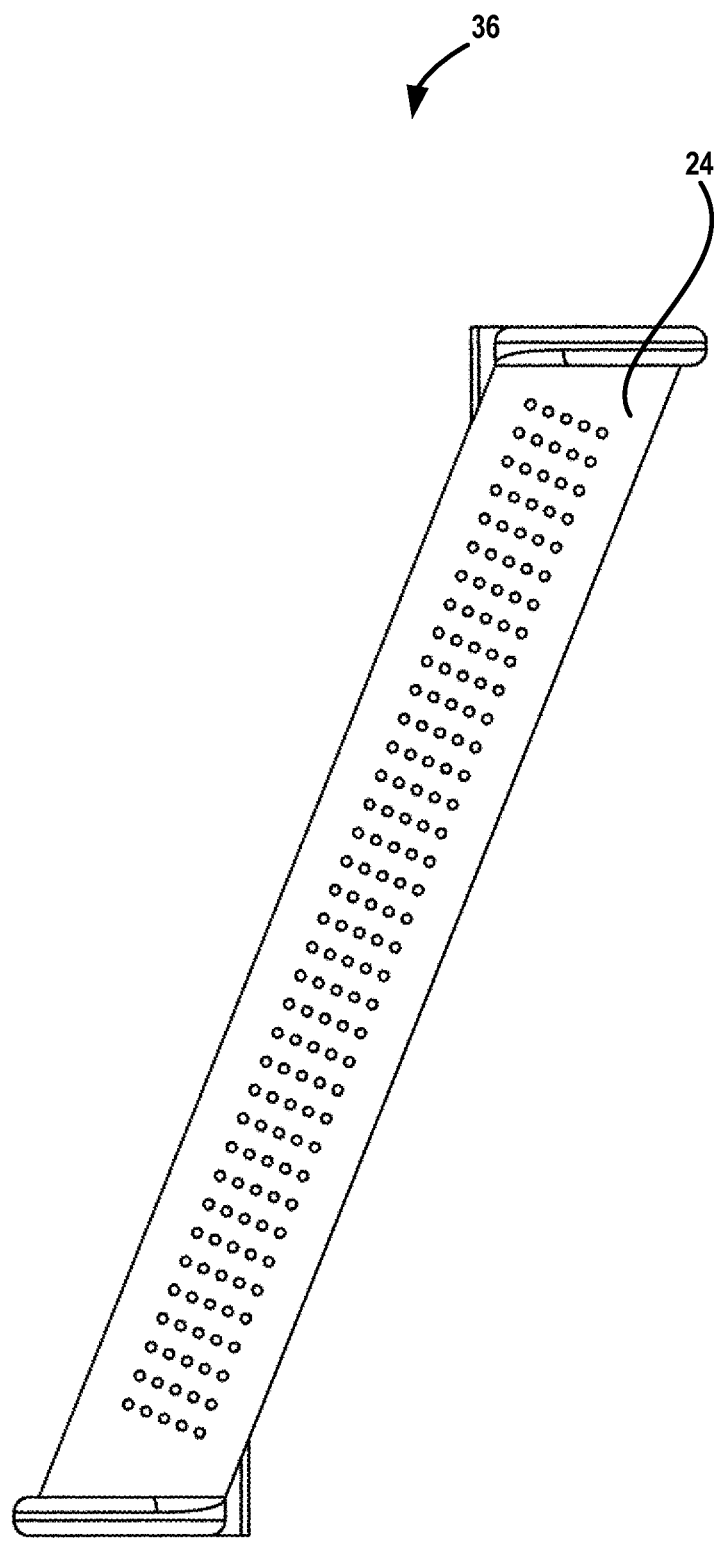
FIG. 10C illustrates a filter comprising an integral pipe filter with off-axial hole placement, according to various embodiments.

With additional reference to FIGS. 10A-C, and having discussed various aspects of a filtration subsystem 6, a filter 36 may comprise an integral pipe filter 24, or a screen filter 26, or any suitable type of filter. An integral pipe filter 24 may comprise a section of ABS pipe with a plurality of apertures disposed therein, so that water may flow through the wall of the ABS pipe and detritus may be retained within the ABS pipe. A screen filter 26 may comprise a metal screen, or a plastic screen, or a semi-porous material, or a porous material, or any screen or material configured to retain detritus while permitting the flow of water.

In various embodiments, detritus may be retained within an inner face of the filter 36 and clean water may exit through an outer face of the filter 36. In this manner, the cleaning of the filter 36 may be enhanced, for example, the tendency of detritus to lodge on surfaces within the filtration subsystem 6 and resist cleaning may be ameliorated by retaining the detritus within the filter 36 while the water flows radially outwardly through the filter 36, rather than retaining the detritus outside the filter 36 while the water flows radially inwardly through the filter 36.

Further enhancing the cleaning of the filter 36, the inflow of water to the system may be along a central longitudinal axis of the filter 36 and proceed parallel to the central longitudinal axis of the filter 36 and turn to exit the filter 36 along a radial path. Thus, the detritus tends readily to flow from the filter 36 along a longitudinal axis upon the opening of a drain fixture 22 disposed generally at opposite end of the filter 36 from the inflow of water, with reference to a longitudinal axis of the filter 36. Because the longitudinal path through the drain fixture 22 is generally of less resistance than the outward radial path through the filter 36, the detritus may readily be expelled through the drain fixture 22 upon opening of the drain fixture 22.

Additionally enhancing the cleaning of the filter 36, with specific reference to FIG. 10C, the inflow of water to the system may be along a central longitudinal axis of the filter 36 and proceed parallel to the central longitudinal axis of the filter 36 and turn to exit the filter 36 along a radial path, however, the filter 36 may only permit the water to flow radially outwardly along a limited circumferential area of the filter 36. For example, the filter 36 may only permit the water to flow outwardly from sides of the filter 36 wherein the radial outward flow of water travels perpendicular to the direction of gravity. In this manner, the tendency of the flowing water to drive detritus into and/or through the outer face of the filter 36 may be ameliorated and the collection of detritus at one end of the filter 36, (rather than along the entire length of the inner face of the filter 36 where it may impede the flow of water) may be enhanced. A relatively smooth section of the inner surface may be provided in the direction of gravity, so that detritus slides along the inner surface of the filter 36 and collects at one end of the filter 36 disposed generally at the opposite end of the filter 36 from the inflow of water, with respect to a longitudinal axis of the filter 36.

Upper Shell & Lower Shell Body Irrigation Filter System

With reference to FIGS. 1, 2A, 5A-C, and 6, an irrigation filter system 2 may comprise a body 4 comprising an upper shell 8, a lower shell 10, and braces 12, and may comprise a filtration subsystem 6. The filtration subsystem 6 may comprise an unfiltered chamber 34, a filter 36, a filtered chamber 40, and a nozzle fixture 42. Water may enter the unfiltered chamber 34 and detritus may collect therein. The water may flow through the filter 36, which retains the detritus, and into the filtered chamber 40. In this manner, the detritus may be retained within at least a portion of the unfiltered chamber 34 and water may be permitted to enter the filtered chamber 40. Subsequently, the water may be released through a nozzle fixture 42 to other systems, such as a sprinkler head, for application on a crop.

A upper shell 8 and a lower shell 10 may comprise corresponding pieces of formed material. The upper shell 8 and the lower shell 10 may join together, for example, by threads and an O-ring, so that they may be disconnected for maintenance. Alternatively, upper shell 8 and lower shell 10 may be joined permanently by gluing, welding, sonic welding, brazing, casting , or any other manufacturing technique. Still further, upper shell 8 and lower shell 10 may be joined together by flanges and an O-ring, loaded in compression, such as by bolts and nuts, clips, or any other technique. For example, with momentary specific reference to FIG. 5C, the upper shell 8 may comprise an upper shell flange 9 and the lower shell 10 may comprise a lower shell flange 11. The upper shell flange 9 may comprise a groove 13 configured to receive an O-ring 15. In further embodiments, the lower shell flange 11 may comprise a groove configured to receive an O-ring 15. In further embodiments, both the lower shell flange 11 and the upper shell flange may comprise grooves configured to receive an O-ring 15. The flanges 9, 11 and O-ring 15 may be loaded in compression, such as by bolts, nuts, clips, and/or any other technique whereby the upper shell 8 and lower shell 10 may be joined together. With renewed reference to FIGS. 1, 2A, 5A-C, and 6, braces 12 may comprise substantially planar sections of material supporting the unfiltered chamber 34 and/or filter 36 within the filtered chamber 40. Thus, it may be said that the braces 12 extend radially inward of the upper shell 8 and/or the lower shell 10 and support the unfiltered chamber 34 and/or filter 36 disposed radially inward of the filtered chamber 40. With specific reference to FIG. 5B, braces 12 may alternatively, or additionally, comprise ridges, bosses, walls, or other structures, supporting the filter 36 and/or retaining the filter 36 in a desired position.

An upper shell 8 and a lower shell 10 may each comprise a single piece of material having various cavities and apertures formed therein. An upper shell 8 and a lower shell 10 may each comprise a milled billet, or may comprise an injection molded part, or may comprise an investment cast part, or may comprise multiple pieces of material joined by at least one of welding, sonic welding, brazing, casting, or any other manufacturing technique. For example, the braces 12 may be formed separately and then joined to an upper shell 8 and/or lower shell 10. Alternatively, an upper shell 8 and/or lower shell 10 may comprise a preformed pipe section such as a ABS pipe section. In this manner, a structure may be formed to support the filtration subsystem 6, and prevent leakage of water from filtration subsystem 6.

An unfiltered chamber 34 further comprises an inlet 20 and a drain fixture 22. An unfiltered chamber 34 may accept the inflow of water via the inlet 20. Inlet 20 may comprise an aperture. In further embodiments, inlet 20 comprises a fitting by which the unfiltered chamber 34 and/or filter 36 may be connected in fluidic communication to a fluid supply. Inlet 20 may comprise a threaded male or female fitting, or any other fitting, and in further embodiments, may support the weight of the irrigation filter system 2. The unfiltered water may carry a mixture of detritus as it enters the unfiltered chamber 34 and/or filter 36 through the inlet 20. As the water enters the unfiltered chamber 34 and/or filter 36, the detritus may collect in the unfiltered chamber 34, lodging in the chamber in response to at least one of the pressure of the flowing water entering the unfiltered chamber 34 and gravity. In various embodiments, the detritus may collect proximate to a drain fixture 22. In this manner, the drain fixture 22 may be opened and at least one of the pressure of the flowing water entering the unfiltered chamber 34 and gravity may force the detritus through the drain fixture 22 and out of the unfiltered chamber 34. In this manner, the unwanted matter may be removed from the system without need of removing the filter 36 or shutting off the flow of water.

While an unfiltered chamber 34 may additionally comprise a filter quick removal plug (FIG. 9; 48), in various embodiments, the threaded coupling of the upper shell 8 and the lower shell 10 may permit disassembly of the upper shell 8 and the lower shell 10 in order to permit removal of the filter 36 and/or cleaning of detritus from within the filter 36.

A filtered chamber 40 may comprise a void in fluidic communication with the unfiltered chamber 34. Water may enter the filtered chamber 40 subsequent to the liberation of detritus from the water by the filter 36 and may be conducted by the filtered chamber 40 to a nozzle fixture 42. A filtered chamber 40 may comprise any shape, volume, and orientation with consideration for directing the flow of water to a nozzle fixture 42 having a desired orientation.

A nozzle fixture 42 may be disposed in fluidic communication with the filtered chamber 40 and may receive water from the filtered chamber 40 and convey it to an external apparatus, such as a spray nozzle. In various embodiments, the nozzle fixture 42 comprises an approximately ¾" male or female threaded fitting, although the nozzle fixture 42 may comprise any fitting selected to permit the attachment of a desired sprinkler head.

A filter 36 may comprise any porous or semi porous material or series of apertures whereby detritus may be collected on one side of the filter 36, and water may be permitted to flow through the pores and/or apertures, apart from the detritus. A filter 36 may comprise any shape corresponding to the unfiltered chamber 34. For instance, in various embodiments, the unfiltered chamber 34 comprises a cylindrical void, and similarly the filter 36 comprises a cylindrical filter. However, in further embodiments, a filter 36 may comprise a shape different from the unfiltered chamber 34; for example, the filter 36 may comprise a planar screen, a conic section, a trapezoidal section, or any other configuration and may be disposed across a portion of the unfiltered chamber 34. For instance, an unfiltered chamber 34 may comprise a rectangular void and filter 36 may comprise a conic section disposed within the rectangular void. In this manner, the filter 36 and the unfiltered chamber 34 are selected with consideration for directing the flow of detritus to a drain fixture 22 in response to at least one of gravity and a pressure of the flowing water entering the unfiltered chamber 34. The filter 36 may be oriented longitudinally parallel to the axes on which the water enters. In this manner, the filtration subsystem 6 may comprise a compact apparatus wherein the filter 36 has a first longitudinal axis and the water enters on a first path comprising an axis parallel to the first longitudinal axis. The filter 36 may be oriented longitudinally diagonal to the axes on which the water enters. In this manner, the filtration subsystem 6 may comprise a compact apparatus wherein the filter 36 has a first longitudinal axis and the water enters on a first path and/or exits on a second path each comprising an axis diagonal to the first longitudinal axis.

Having discussed various aspects of a filtration subsystem 6, a drain fixture 22 is presented in further detail. A drain fixture 22 may comprise an orifice 30 and a ball valve 32. The orifice 30 may be in fluid communication with the unfiltered chamber 34. As depicted in FIG. 5, a drain fixture 22 may pass through the lower shell 10 (or the upper shell 8) and may be extend radially outward of the lower shell 10 and/or the upper shell 8. Alternatively, the drain fixture 22 may extend axially outward of one end of the lower shell 10 and/or upper shell 8. Water mixed with detritus may enter and exit the drain fixture 22 along a third axis, which in some embodiments may be perpendicular to the longitudinal axes of the filter 36, and/or the axes on which water enters the system and/or the axis on which water exits the system via the nozzle fixture 42.

The ball valve 32 may be operated by a technician to open and close the orifice 30 to the ambient environment. By opening and closing the ball valve 32, detritus collected by the filter 36 may be allowed to flow through the ball valve 32 and escape the irrigation filter system 2. In this manner, the ball valve 32 may function as a bypass valve with respect to the nozzle fixture 42, and/or the filtered chamber 40, permitting the water to directly pass from the unfiltered chamber 34 and out of the irrigation filter system 2. The ball valve 32 may be manually operated, or may be automatically operated, such as by an actuator in response to a sensor detecting that a first quantity of detritus has collected within the unfiltered chamber 34. Furthermore, while the ball valve 32 may comprise a ball valve, it may also comprise any type of valve configured to selectively open and close the orifice 30 from the ambient environment.

With additional reference to FIGS. 10A-C, and having discussed various aspects of a filtration subsystem 6, a filter 36 may comprise an integral pipe filter 24, or a screen filter 26, or any suitable type of filter. An integral pipe filter 24 may comprise a section of ABS pipe with a plurality of apertures disposed therein, so that water may flow through the wall of the ABS pipe and detritus may be retained within the ABS pipe. A screen filter 26 may comprise a metal screen, or a plastic screen, or a semi-porous material, or a porous material, or any screen or material configured to retain detritus while permitting the flow of water.

In various embodiments, detritus may be retained within an inner face of the filter 36 and clean water may exit through an outer face of the filter 36. In this manner, the cleaning of the filter 36 may be enhanced, for example, the tendency of detritus to lodge on surfaces within the filtration subsystem 6 and resist cleaning may be ameliorated by retaining the detritus within the filter 36 while the water flows radially outwardly through the filter 36, rather than retaining the detritus outside the filter 36 while the water flows radially inwardly through the filter 36.

Further enhancing the cleaning of the filter 36, the inflow of water to the system may be proceed along a central longitudinal axis of the filter 36 and proceed parallel to the central longitudinal axis of the filter 36 and turn to exit the filter 36 along a radial path. Thus, the detritus tends readily to flow from the filter 36 along a longitudinal upon the opening of a drain fixture 22 disposed generally at opposite end of the filter 36 from the inflow of water, with reference to a longitudinal axis of the filter 36. Because the longitudinal path through the drain fixture 22 is generally of less resistance than the outward radial path through the filter 36, the detritus may readily be expelled through the drain fixture 22 upon opening of the drain fixture 22.

Additionally enhancing the cleaning of the filter 36, with specific reference to FIGS. 5B and 10C, the inflow of water to the system may be along a central longitudinal axis of the filter 36 and turn to proceed parallel to a central longitudinal axis of the filter 36 and turn to exit the filter 36 along a radial path, however, the filter 36 may only permit the water to flow radially outwardly along a limited circumferential area of the filter 36. For example, the filter 36 may only permit the water to flow outwardly from sides of the filter 36 wherein the radial outward flow of water travels perpendicular to the direction of gravity. In this manner, the tendency of the flowing water to drive detritus into and/or through the outer face of the filter 36 may be ameliorated and the collection of detritus at one end of the filter 36, (rather than along the entire length of the inner face of the filter 36 where it may impede the flow of water) may be enhanced. A relatively smooth section of the inner surface may be provided in the direction of gravity, so that detritus slides along the inner surface of the filter 36 and collects at one end of the filter 36 disposed generally at the opposite end of the filter 36 from the inflow of water, with respect to a longitudinal axis of the filter 36.

Primary Reservoir & Secondary Reservoir Body Irrigation Filter System

With reference to FIGS. 1, 2B, 7, and 8, an irrigation filter system 2 may comprise a body 4 comprising primary reservoir 14 and a secondary reservoir 16, and may comprise a filtration subsystem 6. The filtration subsystem 6 may comprise an unfiltered chamber 34, a filter 36, a cross-chamber passage 38, a filtered chamber 40, and a nozzle fixture 42. Water may enter the unfiltered chamber 34 and detritus may collect therein. The water may flow through the filter 36, which retains the detritus, and through the cross-chamber passage 38 into the filtered chamber 40. In this manner, the detritus may be retained within at least a portion of the unfiltered chamber 34 and water may be permitted to enter the filtered chamber 40. Subsequently, the water may be released through a nozzle fixture 42 to other systems, such as a sprinkler head, for application on a crop.

A primary reservoir 14 may comprise a single piece of material having various cavities and apertures formed therein. A primary reservoir 14 may be formed from a milled billet, or an injection molded block, or may an investment cast block, or multiple pieces of material joined by at least one of welding, sonic welding, brazing, casting, or any other manufacturing technique. Alternatively, a primary reservoir 14 may comprise a preformed pipe section such as a ABS pipe section. In this manner, a structure may be formed to support the filtration subsystem 6, and prevent leakage of water from filtration subsystem 6.

A secondary reservoir 16 may comprise a single piece of material having various cavities and apertures formed therein. A secondary reservoir 16 may be formed from a milled billet, or an injection molded block, or may an investment cast block, or multiple pieces of material joined by at least one of welding, sonic welding, brazing, casting, or any other manufacturing technique. Alternatively, a primary reservoir 14 may comprise a preformed pipe section such as a ABS pipe section. In this manner, a structure may be formed to support the filtration subsystem 6, and prevent leakage of water from filtration subsystem 6.

The primary reservoir 14 and the secondary reservoir 16 may be joined together, for example, by pipefittings. With specific reference to FIG. 7, ABS pipefittings may join the primary reservoir 14 and the secondary reservoir 16. A cross-chamber passage 38 may be disposed through the ABS pipefittings joining the primary reservoir 14 and the secondary reservoir 16.

Figure 8:
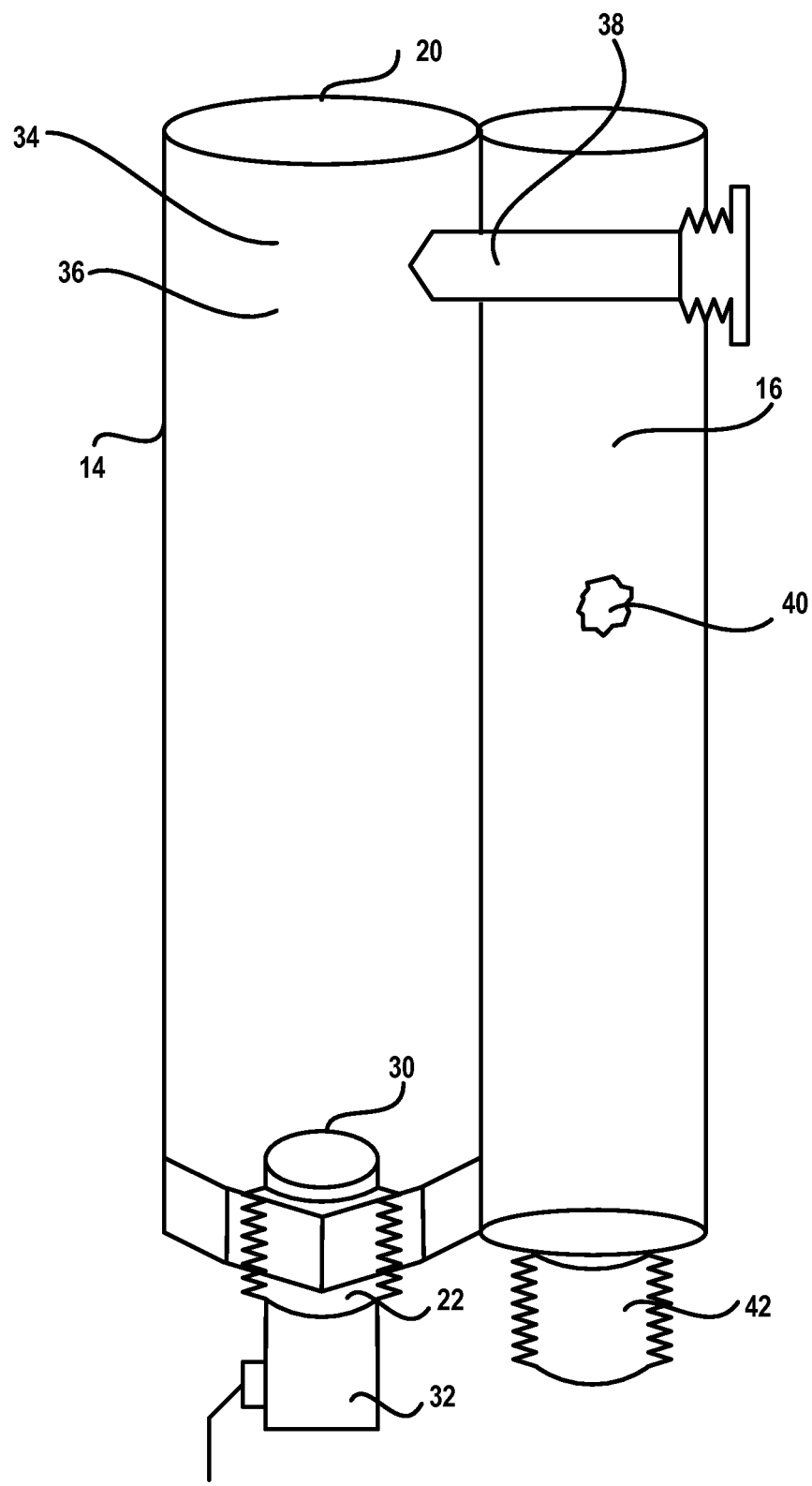

With specific reference to FIG. 8, in further embodiments, the primary reservoir 14 and the secondary reservoir 16 are integrally formed from a single piece of material, having various cavities and apertures formed therein. Alternatively, the primary reservoir 14 and the secondary reservoir 16 may be separately formed from separate pieces of material, which are then joined closely together. A cross-chamber passage 38 may be disposed through an aperture formed in the primary reservoir 14 and a corresponding aperture formed in the secondary reservoir 16.

An unfiltered chamber 34 further comprises an inlet 20 and a drain fixture 22. An unfiltered chamber 34 may accept the inflow of water via the inlet 20. Inlet 20 may comprise an aperture. In further embodiments, inlet 20 comprises a fitting by which the unfiltered chamber 34 and/or filter 36 may be connected in fluidic communication to a fluid supply. Inlet 20 may comprise a threaded male or female fitting, or any other fitting, and in further embodiments, may support the weight of the irrigation filter system 2. The unfiltered water may carry a mixture of detritus as it enters the unfiltered chamber 34 and/or filter 36 through the inlet 20. As the water enters the unfiltered chamber 34 and/or filter 36, the detritus may collect in the unfiltered chamber 34, lodging in the chamber in response to at least one of the pressure of the flowing water entering the unfiltered chamber 34 and gravity. In various embodiments, the detritus may collect proximate to a drain fixture 22. In this manner, the drain fixture 22 may be opened and at least one of the pressure of the flowing water entering the unfiltered chamber 34 and gravity may force the detritus through the drain fixture 22 and out of the unfiltered chamber 34. In this manner, the unwanted matter may be removed from the system without need of removing the filter 36 or shutting off the flowing water.

With specific reference to FIG. 9, an unfiltered chamber 34 may additionally comprise a filter quick removal plug 48. A filter quick removal plug 48 may comprise a removable closure disposed at one end of the unfiltered chamber 34 that may be opened to permit removal of the filter 36 and/or cleaning of detritus from within the filter 36. As one may appreciate, a filter quick removal plug 48 and a drain fixture (FIG. 7; 22) may alternately be incorporated in fluidic communication with the unfiltered chamber 34. In further embodiments, both a filter quick removal plug 48 and a drain fixture (FIG. 7; 22) may be incorporated in fluidic communication with the unfiltered chamber 34. For example, a filter quick removal plug 48 may be disposed at one end of a unfiltered chamber 34, and a drain fixture (FIG. 7; 22) may be disposed within the filter quick removal plug 48, such as in the center of the filter quick removal plug 48.

With renewed reference to FIGS. 1, 2B, 7, and 8, a cross-chamber passage 38 may comprise a channel in fluidic communication with the filtered chamber 40. As the water passes through the filter 36 and is liberated of detritus, it may enter at least one of directly into the filtered chamber 40, or into a cross-chamber passage 38. A cross-chamber passage 38 may be any length, cross-sectional area, and shape desired to direct a desired volume of water in a desired direction and at a desired rate. For example, a cross-chamber passage 38 may comprise a cylindrical void oriented perpendicular to the orientation of the filtered chamber 40. In this manner, the filtered chamber 40 and the unfiltered chamber 34 may be disposed side-by-side, thus permitting the length of the irrigation filter system 2 to be minimized. As such, the overall shape, size, and balance of the filtration subsystem 6 may be tailored to fit within desired criteria. For example, water enters and exits the filtration subsystem 6 on parallel axes. The cross-chamber passage 38 facilitates the orientation of the filter 36 longitudinally parallel to the axes on which the water enters and exits by permitting the axes on which the water enters and the axis on which the water exits to be parallel, rather than non-parallel, and permitting the filter 36 to be longitudinally parallel as well. In this manner, the filtration subsystem 6 may comprise a compact apparatus wherein the filter 36 has a first longitudinal axis and the water enters on a first path comprising an axis parallel to the first longitudinal axis and the water exits on a second path comprising an axis parallel to the first longitudinal axis. Moreover, the second path and first longitudinal axis may be coincident.

Moreover, the cross-chamber passage 38 may be any length, cross-sectional area, and shape selected with consideration for manufacturing concerns. For instance, the cross-chamber passage 38 may comprise a cylindrical void capable of being produced by drilling a hole through a portion of the unitary block 18, passing into the unfiltered chamber 34 and proximate to the filter 36. A cap 44 may be threaded into an external opening created by the drilling process, whereby leakage may be prevented.

Moreover, the cross-chamber passage 38 may be positioned generally away from the drain fixture 22. In this manner, the diversion of the water from entering the cross-chamber passage 38 to instead exiting via the drain fixture 22 during draining of the unfiltered chamber 34 may be enhanced. Furthermore, the cross-chamber passage 38 may be positioned coincident with a path perpendicular to the flow of water into the unfiltered chamber 34, thus discouraging water from entering the cross-chamber passage 38 unless the unfiltered chamber 34 is filled substantially full of water. In this manner, the passage of water into the cross-chamber passage 38 may be substantially prevented upon opening of the drain fixture 22, and may be substantially permitted upon closing of the drain fixture 22 and filling of the unfiltered chamber 34 with water. Water mixed with detritus may enter and exit the drain fixture 22 along a third axis, which in some embodiments may be parallel to the longitudinal axes of the filter 36, and/or the axes on which water enters the system and/or the axis on which water exits the system via the nozzle fixture 42.

A filtered chamber 40 may comprise a void in fluidic communication with at least one of the unfiltered chamber 34 and a cross-chamber passage 38. Water may enter the filtered chamber 40 subsequent to the liberation of detritus from the water by the filter 36 and may be conducted by the filtered chamber 40 to a nozzle fixture 42. A filtered chamber 40 may comprise any shape, volume, and orientation with consideration for directing the flow of water to a nozzle fixture 42 having a desired orientation.

A nozzle fixture 42 may be disposed in fluidic communication with the filtered chamber 40 and may receive water from the filtered chamber 40 and convey it to an external apparatus, such as a spray nozzle. In various embodiments, the nozzle fixture 42 comprises an approximately ¾" male or female threaded fitting, although the nozzle fixture 42 may comprise any fitting selected to permit the attachment of a desired sprinkler head.

A filter 36 may comprise any porous or semi porous material or series of apertures whereby detritus may be collected on one side of the filter 36, and water may be permitted to flow through the pores and/or apertures, apart from the detritus. A filter 36 may comprise any shape corresponding to the unfiltered chamber 34. For instance, in various embodiments, the unfiltered chamber 34 comprises a cylindrical void, and similarly the filter 36 comprises a cylindrical filter. However, in further embodiments, a filter 36 may comprise a shape different from the unfiltered chamber 34; for example, the filter 36 may comprise a planar screen, a conic section, a trapezoidal section, or any other configuration and may be disposed across a portion of the unfiltered chamber 34. For instance, an unfiltered chamber 34 may comprise a rectangular void and filter 36 may comprise a conic section disposed within the rectangular void. In this manner, the filter 36 and the unfiltered chamber 34 are selected with consideration for directing the flow of detritus to a drain fixture 22 in response to at least one of gravity and a pressure of the flowing water entering the unfiltered chamber 34.

Having discussed various aspects of a filtration subsystem 6, a drain fixture 22 is presented in further detail. A drain fixture 22 may comprise an orifice 30 and a ball valve 32. The orifice 30 may be in fluid communication with the unfiltered chamber 34. The ball valve 32 may be operated by a technician to open and close the orifice 30 to the ambient environment. By opening and closing the ball valve 32, detritus collected by the filter 36 may be allowed to flow through the ball valve 32 and escape the irrigation filter system 2. In this manner, the ball valve 32 may function as a bypass valve with respect to the nozzle fixture 42, and/or the filtered chamber 40, permitting the water to directly pass from the unfiltered chamber 34 and out of the irrigation filter system 2. The ball valve 32 may be manually operated, or may be automatically operated, such as by an actuator in response to a sensor detecting that a first quantity of detritus has collected within the unfiltered chamber 34. Furthermore, while the ball valve 32 may comprise a ball valve, it may also comprise any type of valve configured to selectively open and close the orifice 30 from the ambient environment.

With additional reference to FIGS. 10A-C, and having discussed various aspects of a filtration subsystem 6, a filter 36 may comprise an integral pipe filter 24, or a screen filter 26, or any suitable type of filter. An integral pipe filter 24 may comprise a section of ABS pipe with a plurality of apertures disposed therein, so that water may flow through the wall of the ABS pipe and detritus may be retained within the ABS pipe. A screen filter 26 may comprise a metal screen, or a plastic screen, or a semi-porous material, or a porous material, or any screen or material configured to retain detritus while permitting the flow of water.

In various embodiments, detritus may be retained within an inner face of the filter 36 and clean water may exit through an outer face of the filter 36. In this manner, the cleaning of the filter 36 may be enhanced, for example, the tendency of detritus to lodge on surfaces within the filtration subsystem 6 and resist cleaning may be ameliorated by retaining the detritus within the filter 36 while the water flows radially outwardly through the filter 36, rather than retaining the detritus outside the filter 36 while the water flows radially inwardly through the filter 36.

Further enhancing the cleaning of the filter 36, the inflow of water to the system may be along a central longitudinal axis of the filter 36 and proceed parallel to the central longitudinal axis of the filter 36 and turn to exit the filter 36 along a radial path. Thus, the detritus tends readily to flow from the filter 36 along a longitudinal axis upon the opening of a drain fixture 22 disposed generally at opposite end of the filter 36 from the inflow of water, with reference to a longitudinal axis of the filter 36. Because the longitudinal path through the drain fixture 22 is generally of less resistance than the outward radial path through the filter 36, the detritus may readily be expelled through the drain fixture 22 upon opening of the drain fixture 22.

Additionally enhancing the cleaning of the filter 36, with specific reference to FIG. 10C, the inflow of water to the system may be along a central longitudinal axis of the filter 36 and proceed parallel to the central longitudinal axis of the filter 36 and turn to exit the filter 36 along a radial path, however, the filter 36 may only permit the water to flow radially outwardly along a limited circumferential area of the filter 36. For example, the filter 36 may only permit the water to flow outwardly from sides of the filter 36 wherein the radial outward flow of water travels perpendicular to the direction of gravity. In this manner, the tendency of the flowing water to drive detritus into and/or through the outer face of the filter 36 may be ameliorated and the collection of detritus at one end of the filter 36, (rather than along the entire length of the inner face of the filter 36 where it may impede the flow of water) may be enhanced. A relatively smooth section of the inner surface may be provided in the direction of gravity, so that detritus slides along the inner surface of the filter 36 and collects at one end of the filter 36 disposed generally at the opposite end of the filter 36 from the inflow of water, with respect to a longitudinal axis of the filter 36.

Method of Use

Figure 11A:
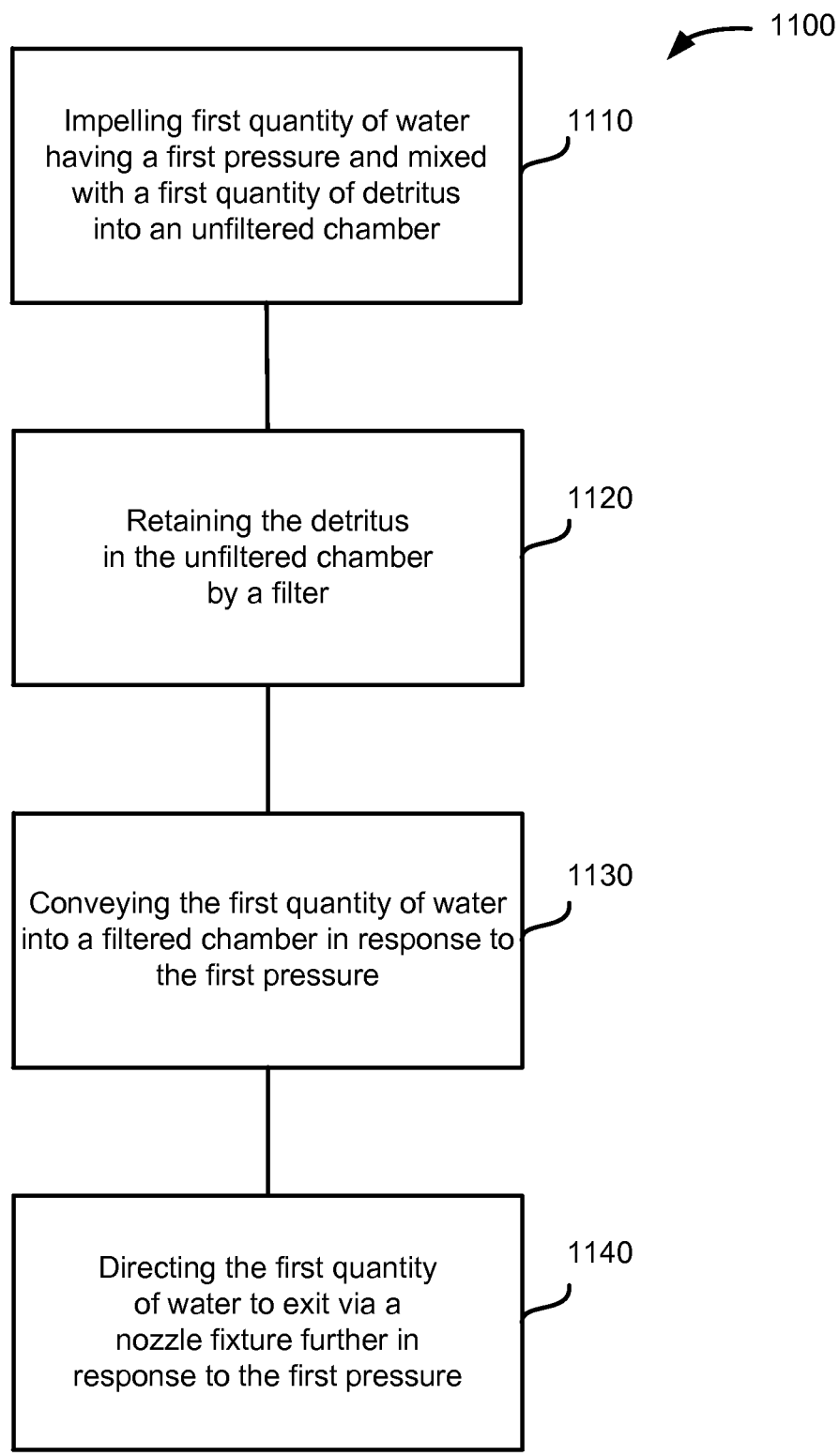
FIGS. 11A-B illustrate methods of filtering water according to various embodiments.

Having discussed various structural aspects of an irrigation filter system 2, an irrigation filter system 2 may be used according to various methods. With reference to FIGS. 1-10 and with particular reference to FIG. 11A, a method 1100 of filtering water using an irrigation filter system 2 may comprise impelling first quantity of water mixed with a first quantity of detritus into an unfiltered chamber 34, wherein the water may have a first pressure and a first volume (Step 1110). The detritus may be retained in the unfiltered chamber 34 by a filter 36 (Step 1120) and the first quantity of water may be conveyed into a filtered chamber 40 (Step 1130) and may exit via a nozzle fixture 42 further in response to the first pressure (Step 1140).

Figure 11B:
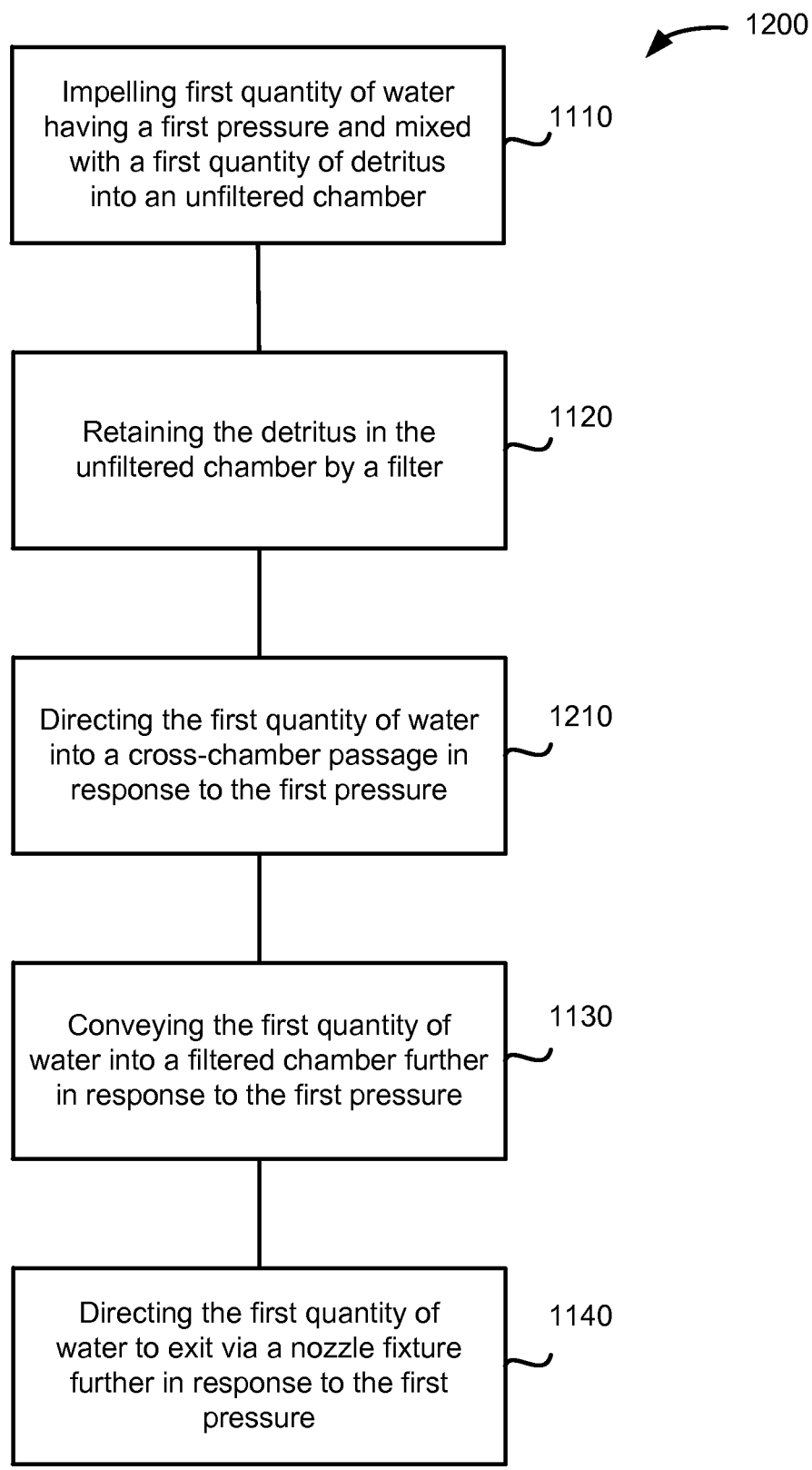

With reference to FIGS. 1-10 and with particular reference to FIG. 11B, a method 1200 of filtering water using an irrigation filter system 2 may comprise impelling first quantity of water mixed with a first quantity of detritus into an unfiltered chamber 34, wherein the water may have a first pressure and a first volume (Step 1110). The detritus may be retained in the unfiltered chamber 34 by a filter 36 (Step 1120) and the water may be directed into a cross-chamber passage 38 (Step 1210) in response to the first pressure. Subsequently, the first quantity of water may be conveyed into a filtered chamber 40 (Step 1130) and may exit via a nozzle fixture 42 further in response to the first pressure (Step 1140).

Figure 12:
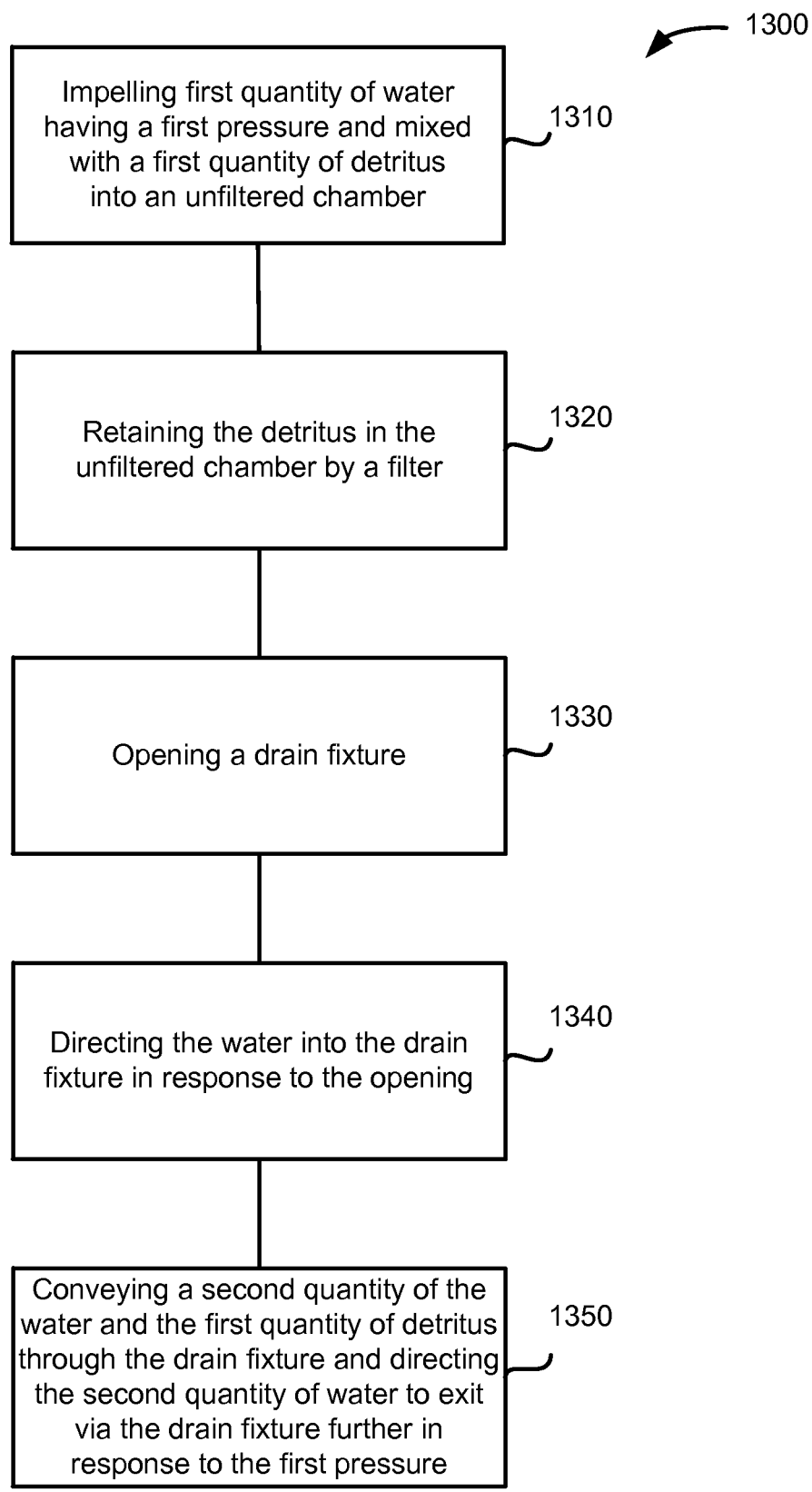
FIG. 12 illustrates a method of cleaning an irrigation filter system according to various embodiments.

Furthermore, with reference to FIGS. 1-10 and with particular reference to FIG. 12, a method 1300 of cleaning an irrigation filter system 2 may comprise impelling a first quantity of water mixed with a first quantity of detritus into the unfiltered chamber 34, wherein the water may have a first pressure and a first volume (Step 1310). The detritus may be retained in the unfiltered chamber 34 by a filter 36 (Step 1320). A drain fixture 22 may be opened (Step 1330). In response to the opening, the water may be directed into the drain fixture 22 (Step 1340). Subsequently, a second quantity of the water and the first quantity of detritus may be conveyed through the drain fixture 22 and may exit via the drain fixture 22 further in response to the first pressure (Step 1350). In various embodiments, the second quantity of water is equal to the first quantity of water.

Materials

Now, having described various components of various exemplary embodiments of an irrigation filter system, the irrigation filter system may be manufactured from various materials. In various embodiments, the irrigation filter system comprises polyvinyl chloride ("PVC"), such as PVC pipe. The irrigation filter system may further comprise thermoplastic aliphatic polyester, such as polylactide ("PLA"), or may comprise other thermoplastics, such as acrylonitrile butadiene styrene ("ABS") plastic, or may comprise any plastic. In some embodiments, the irrigation filter system comprises ultraviolet light ("UV") resistant materials, including, for example, one or more plastics comprising a UV stabilizer to protect the system from long-term UV degradation.

In further exemplary embodiments, the irrigation filter system may comprise metal, plastic, or a combination thereof. For example, the irrigation filter system may comprise metal, such as aluminum. Alternatively, the irrigation filter system may comprise metal, such as titanium, steel, stainless steel, or galvanized material, though it may alternatively comprise numerous other materials configured to provide support, such as, for example, fiberglass, composite, ceramic, ceramic matrix composite, plastics, polymers, alloys, austenitic nickel-chromium-based alloys, glass, binder, epoxy, polyester, acrylic or any material or combination of materials having a desired strength, stiffness, density, weight, or flexibility sufficient to maintain resiliency during use.

In various embodiments, various portions of the irrigation filter system as disclosed herein are made of different materials or combinations of materials, and/or may comprise coatings, including plastics, silicones, or latex. Any suitable material or material combination suitable to enhance or reinforce the resiliency and/or support of the irrigation filter system when subjected to wear in an operating environment or to satisfy other desired weight, size, cost, chemical, physical, or biological properties, for example nonreactivity, durability, UV resistance, light weight, load capacity, and heat tolerance may be implemented. For example, various components may comprise metal while other components may comprise plastics and/or rubber.

Any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. The scope of the inventions is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An irrigation filter system comprising:
a body; and
a filtration subsystem comprising:
an unfiltered chamber comprising a drain fixture, an inlet to the unfiltered chamber defining a first path and configured to receive a first fluid containing a first quantity of a detritus;
a filter comprising a first longitudinal axis; and
a filtered chamber comprising a nozzle fixture,
wherein the filter is positioned outward of the unfiltered chamber and inward of the filtered chamber,
a brace comprising a section of material extending inward from the body and supporting at least one of the unfiltered chamber and the filter within the filtered chamber;
wherein the nozzle fixture and the drain fixture release the first fluid from the irrigation filter system along a second path and a third path respectively,
wherein the drain fixture releases the first quantity of the detritus from the irrigation filter system in response to at least one of: a first fluid pressure and gravity,
wherein the first path, the second path, and the third path are perpendicular to a ground surface and wherein the first longitudinal axis is diagonal relative to both the first path and the second path, and
wherein the inlet is positioned on a first end of the body and the nozzle fixture and the drain fixture are positioned on a second end of the body opposite the first end, wherein the inlet is substantially aligned with the nozzle fixture in order to reduce a rotational net force acting on the irrigation filter system.

2. The irrigation filter system according to claim 1, wherein the drain fixture comprises:
an orifice in fluid communication with the unfiltered chamber; and
a valve configured to selectably open the orifice to release the first quantity of the detritus.

3. The irrigation filter system according to claim 2, further comprising a sensor and an actuator, wherein the valve is configured to be operable by the actuator in response to the sensor detecting that the first quantity of the detritus has collected within the unfiltered chamber.

4. The irrigation filter system according to claim 1, wherein the nozzle fixture comprises:
a fitting selected to permit the attachment of a sprinkler head.

5. The irrigation filter system according to claim 4, wherein the fitting comprises a ¾ inch threaded fitting.

6. The irrigation filter system according to claim 1,
wherein the body comprises an upper shell and a lower shell,
wherein the lower shell comprises a lower shell flange,
wherein the upper shell comprises an upper shell flange comprising a groove, and
wherein the upper shell flange and the lower shell flange are joinable whereby the upper shell flange and the lower shell flange are loaded in compression.

7. The irrigation filter system according to claim 6, where the brace extends inward from at least one of the upper shell and the lower shell.

8. The irrigation filter system according to claim 1, where the brace comprises a ridge configured to retain the filter in position.

9. The irrigation filter system according to claim 1, wherein the filter comprises an integral pipe filter.

10. The irrigation filter system according to claim 1, wherein the filter comprises a screen filter.

11. The irrigation filter system of claim 1, wherein the first path, the second path, and third path are parallel and defined immediately adjacent to the body.

12. The irrigation filter system of claim 1, wherein an inner diameter of the filter is equal to an inner diameter of the inlet.

13. The irrigation filter system of claim 1, wherein the nozzle fixture is positioned closer to the ground surface than an orifice to the drain fixture.

14. The irrigation filter system of claim 1, wherein the filter is coupled directly to the inlet and the drain fixture.

15. An irrigation filter system comprising:
a body; and
a filtration sub system comprising:
an unfiltered chamber comprising a drain fixture, the unfiltered chamber defining a first path configured to receive a first fluid containing a first quantity of a detritus,
a filter positioned radially outward of the unfiltered chamber;
a filtered chamber adjacent to the unfiltered chamber;
a cross-chamber passage comprising a channel, the channel of the cross-chamber passage disposed perpendicular of the longitudinal axis of the filter, and the channel of the cross-chamber passage disposed perpendicular of the longitudinal axis of the filtered chamber; and
a nozzle fixture defining a second path and configured to release the first fluid along the second path,
wherein the drain fixture defines a third path and is configured to release the first quantity of the detritus along the third path, and wherein the first path, the second path, and the third path are perpendicular to a ground surface.

16. The irrigation filter system according to claim 15, wherein the filtration subsystem is configured to receive the filter comprising a first longitudinal axis and disposed within the unfiltered chamber.

17. The irrigation filter system according to claim 16, wherein the brace is configured to retain the filter; and wherein the first longitudinal axis is diagonal relative to the first path and the second path.

18. The irrigation filter system according to claim 15, wherein the first path, and the second path, and the third path are parallel.

* * * * *